(12) United States Patent
Droms et al.

(10) Patent No.: US 7,648,070 B2
(45) Date of Patent: Jan. 19, 2010

(54) LOCATING, PROVISIONING AND IDENTIFYING DEVICES IN A NETWORK

(75) Inventors: Ralph Droms, Boxborough, MA (US); Gary Dennis Vogel, Jr., Sunnyvale, CA (US); Roland Saville, Oakland Park, FL (US)

(73) Assignee: Cisco Technology, Inc., San Jose, CA (US)

( * ) Notice: Subject to any disclaimer, the term of this patent is extended or adjusted under 35 U.S.C. 154(b) by 623 days.

(21) Appl. No.: 11/129,709

(22) Filed: May 12, 2005

(65) Prior Publication Data

US 2005/0253722 A1 Nov. 17, 2005

Related U.S. Application Data

(60) Provisional application No. 60/570,999, filed on May 13, 2004.

(51) Int. Cl.
G06K 7/08 (2006.01)
(52) U.S. Cl. ............... 235/451; 340/572.1; 340/825.49; 340/10.41
(58) Field of Classification Search ................. 235/451; 340/572.1, 825.49, 10.41
See application file for complete search history.

(56) References Cited

U.S. PATENT DOCUMENTS

| | | | |
|---|---|---|---|
| 4,688,026 A | 8/1987 | Schribner et al. | |
| 5,339,073 A | 8/1994 | Dodd et al. | |
| 5,574,722 A | 11/1996 | Slykhouse et al. | |
| 5,646,616 A | 7/1997 | Komatsu | |
| 5,819,042 A | 10/1998 | Hansen | |
| 5,832,503 A | 11/1998 | Malik et al. | |
| 5,850,187 A | 12/1998 | Carrender et al. | |

(Continued)

FOREIGN PATENT DOCUMENTS

WO   WO2005-114604   5/2005

(Continued)

OTHER PUBLICATIONS $EPC_{TM}$ Tag Data Standards Version 1.1 Rev.1.24, EPCglobal, Standard Specification, Apr. 1, 2004, 78 pages.

(Continued)

Primary Examiner—Daniel A Hess
(74) Attorney, Agent, or Firm—Weaver Austin Villeneuve & Sampson LLP

(57) ABSTRACT

Methods and devices are provided for locating, identifying and provisioning devices in a network. According to some implementations of the invention, a combination of EPC code information and existing networking standards form the basis of identifying and provisioning methods. For example, first location information included in a DHCPDISCOVER request can be used to determine appropriate configurations for networked devices. In some such implementations, the first location information is read from an RFID tag near the networked device and is inserted in the DHCPDISCOVER request. The first location information may include any type of absolute or relative coordinate, positioning, cartographic or similar information and/or information from which such information may be derived. Second location information, which may be a logical name, is provided to the device. If the device is an RFID reader, the second location information may be included with reads from RFID tags that are transmitted from the RFID reader.

16 Claims, 16 Drawing Sheets

U.S. PATENT DOCUMENTS

| | | | |
|---|---|---|---|
| 5,887,176 | A | 3/1999 | Griffith et al. |
| 6,070,187 | A | 5/2000 | Subramaniam et al. |
| 6,111,517 | A | 8/2000 | Atick et al. |
| 6,115,079 | A | 9/2000 | McRae |
| 6,300,903 | B1 | 10/2001 | Richards et al. |
| 6,539,281 | B2 | 3/2003 | Wan et al. |
| 6,553,489 | B1 | 4/2003 | Osler et al. |
| 6,587,874 | B1 | 7/2003 | Golla et al. |
| 6,665,713 | B1 | 12/2003 | Hada et al. |
| 6,772,204 | B1 | 8/2004 | Hansen et al. |
| 6,810,040 | B1 | 10/2004 | Lee et al. |
| 6,843,121 | B1 | 1/2005 | DeBar et al. |
| 6,963,282 | B1 | 11/2005 | Yeates et al. |
| 7,002,907 | B1 | 2/2006 | Chen et al. |
| 7,038,573 | B2 | 5/2006 | Bann |
| 7,054,924 | B1 | 5/2006 | Harvey et al. |
| 7,057,511 | B2 | 6/2006 | Shanks et al. |
| 7,064,660 | B2 | 6/2006 | Perkins et al. |
| 7,075,412 | B1 | 7/2006 | Reynolds et al. |
| 7,081,819 | B2 | 7/2006 | Martinez de Velasco Cortina et al. |
| 7,103,040 | B2 * | 9/2006 | Aalbers et al. .............. 370/388 |
| 7,103,886 | B2 | 9/2006 | Haller et al. |
| 7,120,139 | B1 | 10/2006 | Kung et al. |
| 7,129,837 | B2 | 10/2006 | Shannon et al. |
| 7,165,722 | B2 | 1/2007 | Shafer et al. |
| 7,205,897 | B2 | 4/2007 | Lin |
| 7,213,768 | B2 | 5/2007 | Patel et al. |
| 7,242,303 | B2 | 7/2007 | Patel et al. |
| 7,249,170 | B2 | 7/2007 | Tindal et al. |
| 7,322,523 | B2 | 1/2008 | Howarth et al. |
| 7,323,988 | B2 | 1/2008 | Krstulich |
| 7,325,734 | B2 | 2/2008 | Howarth et al. |
| 7,336,175 | B2 | 2/2008 | Howarth et al. |
| 7,345,585 | B2 | 3/2008 | Singhal et al. |
| 7,394,381 | B2 | 7/2008 | Hanson et al. |
| 7,411,915 | B1 | 8/2008 | Spain et al. |
| 7,422,152 | B2 | 9/2008 | Howarth et al. |
| 2001/0012292 | A1 | 8/2001 | Merrill et al. |
| 2001/0028308 | A1 | 10/2001 | De La Huerga |
| 2002/0014964 | A1 | 2/2002 | Okamura |
| 2002/0016739 | A1 | 2/2002 | Ogasawara |
| 2002/0075805 | A1 | 6/2002 | Gupta et al. |
| 2002/0161907 | A1 | 10/2002 | Moon |
| 2003/0046339 | A1 | 3/2003 | Ip |
| 2003/0084279 | A1 | 5/2003 | Campagna |
| 2003/0174714 | A1 | 9/2003 | Manik et al. |
| 2004/0021569 | A1 | 2/2004 | Lepkofker et al. |
| 2004/0061646 | A1 | 4/2004 | Andrews et al. |
| 2004/0069852 | A1 | 4/2004 | Seppinen et al. |
| 2004/0100383 | A1 | 5/2004 | Chen et al. |
| 2004/0108795 | A1 | 6/2004 | Meek et al. |
| 2004/0128389 | A1 | 7/2004 | Kopchik |
| 2004/0257202 | A1 | 12/2004 | Coughlin et al. |
| 2005/0021626 | A1 | 1/2005 | Prajapat et al. |
| 2005/0027778 | A1 | 2/2005 | Dimitrelis et al. |
| 2005/0060208 | A1 | 3/2005 | Gianantoni |
| 2005/0093679 | A1 | 5/2005 | Zai et al. |
| 2005/0099270 | A1 | 5/2005 | Diorio et al. |
| 2005/0199716 | A1 | 9/2005 | Shafer et al. |
| 2005/0209947 | A1 | 9/2005 | Shafer |
| 2005/0252957 | A1 | 11/2005 | Howarth et al. |
| 2005/0252970 | A1 | 11/2005 | Howarth et al. |
| 2005/0252971 | A1 | 11/2005 | Howarth et al. |
| 2005/0253717 | A1 | 11/2005 | Howarth et al. |
| 2005/0253718 | A1 | 11/2005 | Droms et al. |
| 2005/0253722 | A1 | 11/2005 | Droms et al. |
| 2005/0264420 | A1 | 12/2005 | Vogel et al. |
| 2006/0005035 | A1 | 1/2006 | Coughlin |
| 2006/0010086 | A1 | 1/2006 | Klein |
| 2006/0031374 | A1 | 2/2006 | Lu et al. |
| 2006/0033606 | A1 | 2/2006 | Howarth et al. |
| 2006/0044111 | A1 | 3/2006 | Kollar et al. |
| 2006/0071790 | A1 | 4/2006 | Duron et al. |
| 2006/0091999 | A1 | 5/2006 | Howarth |
| 2006/0143318 | A1 | 6/2006 | Prajapat et al. |
| 2006/0253590 | A1 | 11/2006 | Nagy et al. |
| 2006/0266832 | A1 | 11/2006 | Howarth et al. |
| 2007/0013518 | A1 | 1/2007 | Howarth et al. |
| 2007/0027966 | A1 | 2/2007 | Singhal et al. |
| 2007/0080784 | A1 | 4/2007 | Kim et al. |
| 2007/0229274 | A1 | 10/2007 | Patel et al. |
| 2008/0104209 | A1 | 5/2008 | Singhal et al. |

FOREIGN PATENT DOCUMENTS

| | | |
|---|---|---|
| WO | 2005/060208 | 6/2005 |
| WO | WO2005-114545 | 12/2005 |
| WO | WO2005-114602 | 12/2005 |
| WO | WO2005-114603 | 12/2005 |
| WO | WO2007-011591 | 1/2007 |
| WO | WO2008-016488 | 2/2008 |

OTHER PUBLICATIONS

The Global Language of Business, retrieved from the internet: http://www.ean-int.org/locations.html, [retrieved Mar. 24, 2005], 5 pages.

Global Location Number (GLN) Implementation Guide, Uniform Code Council, Inc., May 2002, 13 pages.

International Search Report mailed Sep. 12, 2007 from International Application No. PCT/US05/16958 including Notification of Transmittal; Written Opinion of Searching Authority mailed Sep. 12, 2007 from International Application No. PCT/US05/16958 p. 8.

U.S. Appl. No. 11/954,721 as filed on Dec. 12, 2007, Methods and Devices for Assigning RFID Device Personality, Howarth et al.

Second Notice of Allowance and Notice of Allowability, mailed Jan. 11, 2008 from U.S. Appl. No. 11/010,089.

Supplemental Notice of Allowance and Notice of Allowability, mailed Oct. 22, 2007 from U.S. Appl. No. 11/195,160.

U.S. Appl. No. 11/965,693 as filed on Dec. 27, 2007, Network Based Device for Providing RFID Middleware Functionality, Singhal et al.

Notice of Allowance and Notice of Allowability, mailed Mar. 12, 2007 from U.S.Appl. No. 11/073,245.

U.S. Office Action mailed Mar. 3, 2008, for U.S. Appl. No. 11/809,139.

international Search Report dated Feb. 17, 2006, from related International Application No. PCT/US05/15322, 5 pp. including Notification of Transmittal.

Written Opinion of the International Searching Authority dated Feb. 17, 2006, from related International Application No. PCT/US05/15322, 3 pp.

Lonvick, C., The BSD Syslog Protocol, RFC 3164, Aug. 2001, 28 pages.

Simple Network Management Protocol, Internetworking Technologies Handbook, Chapter-56, printed Jul. 14, 2005, 12 pages.

International Search Report dated Oct. 13, 2005, from (related) International Application No. PCT/US05/16484, 6 pp. including Notification of Transmittal.

Written Opinion of the International Searching Authority dated Oct. 13, 2005, from (related) International Application No. PCT/US05/16484, 5 pp.

Harrington, D., et al, An Architecture for DescribingSimple Network Management Protocol (SNMP) Management Frameworks, RFC 3411, Dec. 2002, 64 pages.

Presuhn, R., Editor, Version 2 of the Protocol Operations for the Simple Network Management Protocol (SNMP), RFC 3416, Dec. 2002, 31 pages.

"*Cisco Application-Oriented Networking: A Network-Based Intelligent Message Routing System*", http://www.cisco.com/en/US/products/ps6438/products_data_sheet0900aecd802c1f9c.html Data Sheet, Cisco Systems, Inc., Jul. 13, 2005, pp. 1-7.

"*Cisco Catalyst 6500 Series Application-Oriented Networking Module*", http://www.cisco.com/en/US/products/ps6438/products_data_sheet0900aecd802c1fe9.html Data Sheet, Cisco Systems, Inc. Jul. 13, 2005, pp. 1-3.

"Cisco Application-Oriented Networking—A Network Embedded Intelligent Message Routing System", http://www.cisco.com/en/US/products/ps6438/prod_bulletin0900aecd802c201b.html Product Bulletin No. 2886, Cisco Systems, Inc. Jul. 13, 2005, pp. 1-3.

"Cisco Catalyst 6500 Series Application-Oriented Networking Module: Large Photo", Photo, Retrieved from the internet: http://www.cisco.com/en/US/products/ps6448/prod_view_selector.html [Retrieved Jul. 13, 2007], Cisco Systems, Inc. 1 page.

"The EPCglobal Architecture Framework" EPCglobal Final Version of Jul. 1, 2005, pp. 1-53.

Girardot, Marc and Sundaresan, Neel, "Millau: an encoding format for efficient representation and exchange of XML over the web" [Retrieved Jan. 31, 2005]. Retrieved from the internet: http:www9.org/w9cdrom/154/154.html 25 pages.

Fujitsu Limited, et al., "Web Services Reliability (WS-Reliability) Ver1.0", Jan. 8, 2003. pp. 1-45.

Biloruset, Ruslan et al., "Web Services Reliable Messaging Protocol (WS-ReliableMessaging)", Mar. 2004, pp. 1-40.

Mockapetris, P., "Domain Names—Concepts and Facillities", RFC 1034, Nov. 1987, 43 pages.

Mockapetris, P., "Domain Names—Implementation and Specification", RFC 1035, 55 pages.

International Search Report dated Jul. 13, 2006, from (related) International Application No. PCT/US05/16319, 5 pp. including Notification of Transmittal.

Written Opinion of the International Searching Authority dated Jul. 13, 2006, from (related) International Application No. PCT/US05/16319, 5 pp.

US Office Action mailed Aug. 9, 2006 from (related) U.S. Appl. No. 10/866,507.

US Office Action mailed Oct. 6, 2006 from (related) U.S. Appl. No. 10/866,506.

US Office Action mailed Oct. 6, 2006 from (related) U.S. Appl. No. 10/866,285.

US Office Action mailed Nov. 13, 2006 from (related) U.S. Appl. No. 11/073,245, 12 pp.

US Office Action mailed Jan. 18, 2007 from (related) U.S. Appl. No. 10/866,507, 4 pp.

R. Droms, Dynamic Host Configuration Protocol, http://www.ietf.org/rfc/, Bucknell University, Mar. 1997 (RFC 2131), printed Mar. 24, 2005, 43 pages.

S. Alexander et al., DHCP Options and BOOTP Vendor Extensions, http://www.ietf.org/rfc/, Silicon, Graphics, Inc., Mar. 1997 (RFC 2132), printed Mar. 24, 2005, 32 pages.

G. Stump et al., The User Class Option for DHCP, http://www.ietf.org/rfc/, IBM, Nov. 2000 (RFC 3004), printed Mar. 24, 2005, 6 pages.

Y. T'Joens, DHCP Reconfigure Extension, http://www.ietf.org/rfc/, Alcatel, Dec. 2001, printed Mar. 24, 2005 (RFC 3203), 6 pages.

M. Patrick, DHCP Relay Agent Information Option, http://www.ietf.org/rfc/, Motorola BCS, JAn. 2001 (RFC 3046), printed Mar. 24, 2005, 14 pages.

EPCgl, Frequently Asked Questions, http://www.epcglobalinc.com/about/faqs.html, printed Mar. 24, 2005, 9 pages.

M Johnston, DHCP Preboot Execution Environment (PXE) Options draft-ietf-dhc-pxe-options-01.txt, Dynamic Host Configuration Working Group, Intel Coporation, Jan. 21, 2005, 7 pages.

R. Johnson, TFTP Server Address DHCP Option draft-raj-dhc-tftp-addr-option-11.txt, Network Working Group, Cisco Systems, Inc., Feb. 6, 2005, 7 pages.

J. Littlefield, Vendor-Identifying Vendor Options for Dynamic Host Configuration Protocol version 4 (DPHCPv4), Network Working Group, Request for Comments: 3925, Category: Standards Track, Cisco Systems, Inc., Oct. 2004, 9 pages.

H. Schulzrinne, Dynamic Host Configuration Protocol (DHCPv4 and DHCPv6) Option for Civic Addresses Configuration Information draft-ietf-geopriv-dhcp-civil-05, Columbia University, Feb. 19, 2004.

J. Polk et al., Dynamic Host Configuration Protocol Option for Coordinate-based Location Configuration Information, Network Working Group, Request for Comments: 3825, Category: Standards Track, Cisco Systems, Jul. 2004, 15 pages.

AeroScout Visibility System: Bridging the Gap Between Wi-Fi, Active RFID and Telemetry, AeroScout Enterprise Visibility Solutions, http://www.aeroscout.com/content.asp?page=SystemOverview, printed Apr. 16, 2005, 3 pages.

WhereNet, Products, http://wherenet.com/products_main.html, printed Apr. 16, 2005, 2 pages.

US Office Action mailed Mar. 22, 2007 from (related) U.S. Appl. No. 10/866,506.

US Office Action mailed Apr. 4, 2007 from (related) U.S. Appl. No. 10/866,285.

US Office Action mailed Jun. 18, 2007 from (related) U.S. Appl. No. 11/010,089.

US Office Action mailed Jun. 26, 2007 from U.S. Appl. No. 11/195,160.

Notice of Allowance and Notice of Allowability, mailed Sep. 10, 2007 from U.S. Appl. No. 10/866,506.

Notice of Allowance and Notice of Allowability, mailed Sep. 28, 2007 from U.S. Appl. No. 10/866,507.

Notice of Allowance and Notice of Allowability, mailed Sep. 10, 2007 from U.S. Appl. No. 10/866,285.

Notice of Allowance and Notice of Allowability, mailed Oct. 11, 2007 from U.S. Appl. No. 11/010,089.

Notice of Allowance and Notice of Allowability, mailed Sep. 19, 2007 from U.S. Appl. No. 11/195,160.

U.S. Appl. No. 10/896,410, System and Method for Automatically Configuring Switch Ports With Appropriate Features, Spain et al., filed Jul. 21, 2004.

Office Action (Restriction Requirement) mailed Apr. 1, 2008 from U.S. Appl. No. 11/119,169.

First Office Action from the Chinese Patent Application No. 200580015167.4 issued on Feb. 29, 2008.

First Office Action from the Chinese Patent Application No. 200580015169.3 issued on Feb. 29, 2008.

First Office Action from the Chinese Patent Application No. 200580015168.9 issued on Feb. 29, 2008.

Office Action mailed May 12, 2008 from U.S. Appl. No. 11/104,140.

Office Action from Canadian Patent Application No. 2,565,099 issued Feb. 4, 2008.

Office Action from Canadian Patent Application No. 2,565,456 issued on Feb. 1, 2008.

International Preliminary Report on Patentability mailed Nov. 23, 2006, Applcation No. PCT/US2005/016484.

International Preliminary Report on Patentability mailed Nov. 23, 2006, Application No. PCT/US2005/015322.

International Preliminary Report on Patentability mailed Nov. 23, 2006, Application No. PCT/US2005/016319.

International Preliminary Report on Patentability mailed Oct. 11, 2007, Application No. PCT/US2005/016958.

International Searching Authority, "Notification of Transmittal of the International Search Report or the Declaration," PCT/US07/16321, dated May 19, 2008, 11 pages.

International Searching Authority, "Written Opinion of the International Searching Authority" PCT/US07/16321, dated May 19, 2008, 11 pages.

International Searching Authority, "Notification of Transmittal of the International Search Report of the International Searching Authority, or the Declaration," PCT/US06/, dated Mar. 6, 2008, 14 pages.

International Searching Authority, "Written Opinion of the International Searching Authority," PCT/US06/, dated Mar. 6, 2008, 14 pages.

U.S. Appl. No. 12/082,635, Methods and Devices for Providing Scalable RFID Networks, Howarth et al., filed Apr. 11, 2008.

Office Action mailed Aug. 6, 2008 from U.S. Appl. No. 11/119,169.

U.S. Office Action (Restriction Requirement) mailed Jul. 28, 2008, for U.S. Appl. No. 11/182,312.

U.S. Office Action mailed Aug. 13, 2008, for U.S. Appl. No. 11/954,721.

Office Action mailed Aug. 13, 2008 from U.S. Appl. No. 11/954,721.

Second Office Action for CN Patent Application No. 200580015168.9 dated Aug. 15, 2008.

Final Office Action mailed Oct. 6, 2008 from U.S. Appl. No. 11/104,140.

Second Office Action from the Chinese Patent Application No. 200580015167.4 mailed Aug. 15, 2008.
Second Office Action from the Chinese Patent Application No. 200580015169.3 mailed Aug. 15, 2008.
Office Action from the Canadian Patent Application No. 2,565,099 mailed Nov. 17, 2008.
Office Action mailed Nov. 26, 2008 from U.S. Appl. No. 11/182,312.
US Office Action dated Oct. 6, 2006 issued in U.S. Appl. No. 10/866,506.
US Office Action dated Mar. 22, 2007 issued in U.S. Appl. No. 10/866,506.
US Office Action dated Jan. 18, 2007 issued in U.S. Appl. No. 10/866,507.
US Office Action dated Aug. 9, 2006 issued in U.S. Appl. No. 10/866,507.
US Office Action dated Oct. 6, 2006 issued in U.S. Appl. No. 10/866,285.
US Office Action dated Apr. 4, 2007 issued in U.S. Appl. No. 10/866,285.
US Notice of Allowance dated Jun 1, 2009 issued in U.S. Appl. No. 11/954,721.
US Notice of Allowance dated Feb. 11, 2009 issued in U.S. Appl. No. 11/954,721.
US Office Action dated Mar. 31, 2009 issued in U.S. Appl. No. 11/304,944.
US Office Action dated Jun. 18, 2007 issued in U.S. Appl. No. 11/010,089.
US Office Action dated Mar. 4, 2009 issued in U.S. Appl. No. 11/104,140.
US Notice of Allowance and Examiner's Amendment dated Feb. 11, 2009 issued in U.S. Appl. No. 11/119,169.
US Examiner's Amendment dated Nov. 7, 2007 issued in U.S. Appl. No. 11/195,160.
US Supplemental Notice of Allowance dated Oct. 22, 2007 issued in U.S. Appl. No. 11/195,160.
US Notice of Allowance and Examiner Amendment dated Mar. 27, 2008 issued in U.S. Appl. No. 10/896,410.
US Office Action dated Oct. 10, 2007 issued in U.S. Appl. No. 10/896,410.
Chinese Office Action (third) dated Feb. 20, 2009 issued in CN1954327 [CN200580015167.4 - P377CN].
European Examination Report dated Sep. 18, 2008 issued in EP06739488 [P412EP].
Chinese Office Action dated Jun. 27, 2008 issued in CN200580031604.01.
PCT International Preliminary Examination Report dated Nov. 14, 2006 issued in WO2005114545 [PCT/US2005/016484].
PCT International Search Report dated Nov. 8, 2005 issued in WO2005-114545 [PCT/US2005/016484].
PCT Written Opinion dated Nov. 8, 2005 issued in WO2005114545 [PCT/US2005/016484].
PCT International Preliminary Examination Report dated Nov. 14, 2006 issued in WO2005-114603 [PCT/US2005/016319].
PCT International Search Report dated Jul. 13, 2006 issued in WO2005-114603 [PCT/US2005/016319].
PCT Written Opinion dated Jul. 13, 2006 issued in WO2005-114603 [PCT/US2005/016319].
PCT International Search Report dated Sep. 12, 2007 issued in WO2005114604 [PCT/US2005/016958].
PCT Written Opinion dated Sep. 12, 2007 issued in WO2005114604 [PCT/US2005/016958].
PCT Written Opinion dated Mar. 6, 2008 issued in WO2007011591 [PCT/US2006/026970].
Kanellos, "Newsmaker: Making sense of sensors, " CNET News. com:news.com.com/Making +sense+of+sensors/ 2008-1082_ 3-5829415.html, Published: Aug. 12, 2005.
Stump et al., "The User Class Option for DHCP," RFC 3004, Nov. 2000, 6 pages.
Mohl, Dirk S., "IEEE 1588: Running Real-Time on Ethernet," retrieved from the Internet: <URL:http//ethernet.industrial-networking.com/articles/i17 real-time.asp>. cited by other.
Montague, Jim, "Ethernet Hits Real-Time ... Really," Control Engineering, Dec. 1, 2003, copyright 2004 Reed Business Information, a division of Reed Elsevier Inc.; retrieved from the Internet: <URL:http://www.manufacturing.net/ctl/iindex.asp?dlayout=articlePrint&- articleID=CA339683>. cited by other.
Australian Office Action dated Apr. 17, 2009 from Application No. 2005246794; 2 pgs.

* cited by examiner

LOCATING, PROVISIONING AND IDENTIFYING DEVICES IN A NETWORK

CROSS-REFERENCES TO RELATED APPLICATIONS

This application claims priority to U.S. Provisional Patent Application No. 60/570,999, entitled "Methods and Devices for Uniquely Provisioning RFID Devices" and filed on May 13, 2004, which is hereby incorporated by reference for all purposes. This application is related to U.S. patent application Ser. No. 10/866,506, entitled "Methods and Devices for Uniquely Provisioning RFID Devices" and filed on Jun. 9, 2004, to U.S. patent application Ser. No. 10/866,507, entitled "Methods and Devices for Locating and Uniquely Provisioning RFID Devices" and filed on Jun. 9, 2004, to U.S. patent application Ser. No. 10/866,285, entitled "Methods and Devices for Assigning RFID Device Personality" and filed on Jun. 9, 2004, to U.S. patent application Ser. No. 10/891,238, entitled "Methods and Devices for Determining the Status of a Device" and filed on Jul. 13, 2004, to U.S. patent application Ser. No. 10/876,410, entitled "System and Method for Automatically Configuring Switch Ports with Appropriate Features" and filed Jul. 21, 2004, to U.S. patent application Ser. No. 11/010,089, entitled "Methods and Devices for Providing Scalable RFID Networks" and filed on Dec. 9, 2004, to U.S. patent application Ser. No. 11/104,140, filed on Apr. 11, 2005, entitled "Automated Configuration of Network Device Ports" and to U.S. patent application Ser. No. 11/119,169, filed on Apr. 29, 2005, entitled "Locating and Provisioning Devices in a Network" (collectively, the "Cross-Referenced Applications"), all of which are hereby incorporated by reference for all purposes.

BACKGROUND OF THE INVENTION

1. Field of the Invention

The present invention relates to provisioning devices in a network.

2. Description of the Related Art

Bar codes containing a Universal Product Code ("UPC") have become a nearly ubiquitous feature of modern life. The vast majority of products, as well as packages, containers and other elements in the stream of commerce now bear a bar code to allow for convenient tracking and inventory control.

However, bar codes have some drawbacks. Bar codes are "read only," in that they are merely a printed set of machine-readable parallel bars that cannot be updated. Bar codes cannot transmit information, but instead must be read by a scanner. Bar codes must be scanned within a relatively short distance and must be properly oriented for the bar code to be read.

"Smart labels," generally implemented by RFID tags, have been developed in an effort to address the shortcomings of bar codes and add greater functionality. RFID tags have been used to keep track of items such as airline baggage, items of clothing in a retail environment, cows and highway tolls. As shown in FIG. 1, an RFID tag 100 includes microprocessor 105 and antenna 110. In this example, RFID tag 100 is powered by a magnetic field 145 generated by an RFID reader 125. The tag's antenna 110 picks up the magnetic signal 145. RFID tag 100 modulates the signal 145 according to information coded in the tag and transmits the modulated signal 155 to the RFID reader 125.

Most RFID tags use one of the Electronic Product Code ("EPC" or "ePC") formats for encoding information. EPC codes may be formed in various lengths (common formats are 64, 96 and 128 bits) and have various types of defined fields, which allow for identification of, e.g., individual products as well as associated information. These formats are defined in various documents in the public domain. One such document is EPC Tag Data Standards Version 1.1 Rev 1.24 (EPCglobal® 2004), which is hereby incorporated by reference for all purposes.

One exemplary RFID tag format is shown in FIG. 1. Here, EPC 120 includes header 130, EPC Manager field 140, Object class field 150 and serial number field 160. EPC Manager field 140 contains manufacturer information. Object class field 150 includes a product's stock-keeping unit ("SKU") number. Serial number field 160 is a 40-bit field that can uniquely identify the specific instance of an individual product i.e., not just a make or model, but also down to a specific "serial number" of a make and model.

In theory, RFID tags and associated RFID devices (such as RFID readers and printers) could form part of a network for tracking a product (or a group of products) and its history. However, various difficulties have prevented this theory from being realized. One problem that has required considerable time and energy from RF engineers is the development of lower-cost RFID tags with acceptable performance levels. Inductively-coupled RFID tags have acceptable performance levels. These tags include a microprocessor, a metal coil and glass or polymer encapsulating material. Unfortunately, the materials used in inductively-coupled RFID tags make them too expensive for widespread use: a passive button tag costs approximately $1 and a battery-powered read/write tag may cost $100 or more.

Capacitively-coupled RFID tags use conductive ink instead of the metal coil used in inductive RFID tags. The ink is printed on a paper label by an RFID printer, creating a lower-cost, disposable RFID tag. However, conventional capacitively-coupled RFID tags have a very limited range. In recent years, RF engineers have been striving to extend the range of capacitively-coupled RFID tags beyond approximately one centimeter.

In part because of the significant efforts that have been expended in solving the foregoing problems, prior art systems and methods for networking RFID devices are rather primitive. RFID devices have only recently been deployed with network interfaces. Device provisioning for prior art RFID devices is not automatic, but instead requires a time-consuming process for configuring each individual device. Prior art RFID devices and systems are not suitable for large-scale deployment of networks of RFID devices.

Conventional RFID devices also have a small amount of available memory. A typical RFID device may have approximately 0.5 Mb of flash memory and a total of 1 Mb of overall memory. The small memories of RFID devices place restrictions on the range of possible solutions to the problems noted herein. In addition, an RFID device typically uses a proprietary operating system, e.g., of the manufacturer of the microprocessor(s) used in the RFID device.

Moreover, many RFID devices are deployed in a hostile industrial environment (such as a warehouse or factory) by relatively unskilled "IT" personnel. If a device deployed in one location fails, for example, it may simply be removed and replaced by a functioning device that was deployed in another location. Therefore, it would be desirable to provide methods and devices for uniquely and individually identifying RFID devices and their precise location in a network.

In addition, RFID devices are being deployed with "static" knowledge of where the device was deployed at the original time of deployment. In practice, RFID devices are moved if another device is damaged or not functioning. In general, it is desirable to allow for the movement of RFID devices. However, if an RFID device is moved, prior art systems do not know to what location the RFID device has been moved.

It would also be desirable to provision such RFID devices automatically for their expected use. RFID devices perform different functions and may interface to the upstream systems differently depending on where they are located. The functions they perform, as well as the unique settings to perform those functions, will be referred to herein as the device "personality." It would be desirable not only to identify an RFID device and to determine its location, but also to provision, configure and deploy software and firmware to allow the RFID device to perform various functions and roles based on location. As used herein, "provisioning" a device can include, but is not limited to, providing network configuration, providing personality configuration, incorporating the device into a network database and enabling the device with software (e.g., business process software). It would also be desirable to provide for convenient reprovisioning and personality updates of RFID devices.

SUMMARY OF THE INVENTION

Methods and devices are provided for locating, identifying and provisioning devices in a network. According to some implementations of the invention, a combination of EPC code information and existing networking standards form the basis of identifying and provisioning methods. For example, MAC address information and EPC information can be combined to identify a particular device and its location in a network. Upper-level applications can be notified, for example, that a particular device is available for use.

For implementations using the Dynamic Host Configuration Protocol ("DHCP"), DHCP Options may be used to pass identification, location and provisioning information. For example, selected DHCP Options may be used to indicate a device type, to provide an EPC code uniquely identifying the particular device, indicating the company name using the device and indicating how the device is being used.

In some implementations of the invention, location information included in a DHCPDISCOVER request can be used to determine appropriate configurations for networked devices. In some such implementations, the location information is read from an RFID tag near the networked device and is inserted in the DHCPDISCOVER request. The location information may include any convenient type of absolute or relative coordinate, positioning, cartographic or similar information and/or information from which such information may be derived. Some such implementations of the invention use DHCPINFORM (RFC 2131) and DHCP Options (RFCs 2132 and 3004) to pass current provisioning and personality information. Moreover, some such implementations of the invention use the DHCPFORCERENEW command (RFC 3203) from a DHCP server to initiate an update or to complete reconfiguration, as required.

Some implementations of the invention provide a method of provisioning a device. The method includes these steps: initializing an RFID device; reading RFID tag data from an RFID tag; inserting the RFID tag data in an option field of a DHCPDISCOVER request; sending the DHCPDISCOVER request to a DHCP server; ascertaining, based at least in part on the RFID tag data, a location and a logical name of the RFID device; determining, based in part on the location of the RFID device, an appropriate configuration for the RFID device; and provisioning the RFID device according to the appropriate configuration, wherein the provisioning step comprises provisioning the RFID device with a logical name.

The RFID device may be, for example, a wireless RFID device. The ascertaining step may involve accessing a data structure that includes RFID tag data and corresponding location data and logical names. At least part of the ascertaining step may be performed by the DHCP server.

Some aspects of the invention provide methods of provisioning a wireless device. Some such methods include these steps: receiving IEEE 802.11b location data from a plurality of wireless access points; ascertaining, based at least in part on the IEEE 802.11b location data, a location and a logical name of a wireless device; determining an appropriate configuration for the wireless device according to the location; and provisioning the wireless device, wherein the configuring step comprises supplying the wireless device with the appropriate configuration and with a logical name.

The wireless device may be, for example, a manufacturing device, an RFID device, a portable digital assistant or a laptop computer. The IEEE 802.11b location data could be, for example, time data, signal strength data or both.

Alternative methods for provisioning a device are also provided. Some such methods include these steps: receiving a DHCP request; ascertaining a location and a logical name of a device according to information in the DHCP request; determining, based at least in part on the location, an appropriate configuration for the device; and providing the device with the appropriate configuration and with a logical name.

The ascertaining step may involve determining a location encoded in the DHCP request. The ascertaining step may involve accessing a data structure and mapping the information in the DHCP request to corresponding location data.

Another aspect of the invention provides a method for deploying a uniquely-provisioned RFID device in a network. The method includes these steps: reading first location information from a first RFID tag; forming a DHCPDISCOVER request that includes an electronic product code of an RFID reader and the first location information; sending the DHCPDISCOVER request to a DHCP server; receiving provisioning information from the DHCP server that enables a desired functionality according to an identity and a location of the RFID reader, the provisioning information including second location information; and provisioning the RFID reader according to the provisioning information, thereby enabling the RFID reader to read nearby RFID tags and to transmit RFID tag information and second location information to an RFID network.

The first location information may be, for example, cartographic information such as coordinate information, latitude/longitude or civil address information. The second location information may include a logical name.

Some embodiments of the invention provide a network, comprising: a plurality of RFID devices; a plurality of switches connecting the RFID devices to the network; and a DHCP server. At least some of the RFID devices include these elements: means for reading first location information from a first RFID tag; means for forming a DHCPDISCOVER request that includes an electronic product code ("EPC") of an RFID reader and the first location information; means for sending the DHCPDISCOVER request to a DHCP server; means for receiving provisioning information from the DHCP server that enables a desired functionality according to an identity and a location of the RFID reader, the provisioning information including second location information; and means for provisioning the RFID reader according to the provisioning information, thereby enabling the RFID reader to read nearby RFID tags and to transmit RFID tag information and second location information to an RFID network.

The DHCP server includes these elements: means for receiving the DHCPDISCOVER request; means for automatically identifying an RFID device according to a media access control address and an EPC included in the DHCPDISCOVER request; means for locating the RFID device and determining the second location information according to the first location information included in the DHCPDISCOVER request; and means for providing the RFID device with a desired functionality and the second location information.

Some aspects of the invention provide yet another method of provisioning a device. The method includes these steps: initializing an RFID device; obtaining first location data; inserting the first location data in an option field of a DHCPDISCOVER request; sending the DHCPDISCOVER request to a Dynamic Host Configuration Protocol ("DHCP")server; determining provisioning information, including a logical name, based at least in part on the first location data; providing the provisioning information to the device; configuring the device according to the provisioning information; reading RFID tag data from RFID tags; and transmitting the RFID tag data to a middleware server along with the logical name. In some implementations, the RFID device includes global positioning system ("GPS") capability and the first location data comprise GPS data. The methods of the present invention may be implemented, at least in part, by hardware and/or software. For example, some embodiments of the invention provide computer programs embodied in machine-readable media. The computer programs include instructions for controlling one or more devices to perform the methods described herein.

DETAILED DESCRIPTION OF THE INVENTION

Figure 1:
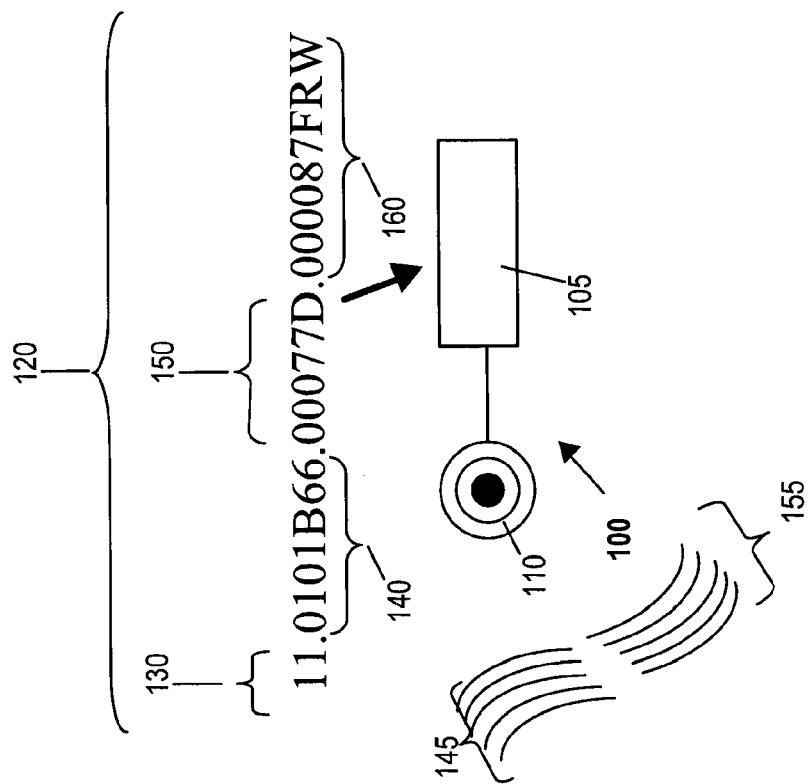
FIG. 1 is a diagram illustrating an RFID tag.

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Although the present invention involves methods and devices for locating, identifying and provisioning individual RFID devices in a network, many aspects of the present invention can be applied to identifying and provisioning other types of devices in a network. For example, the present invention may also be used for locating, identifying and provisioning manufacturing devices, networked sensor devices, IPphones, portable digital assistants and other networked devices, including wireless and wired devices. Similarly, although much of the discussion herein applies to implementations using the DHCP protocol, the present invention is not protocol-specific and may be used, for example, in implementations using UPnP, 802.1ab or similar discovery protocols. Likewise, while the implementations described herein refer to exemplary DHCP Options, other DHCP Options may advantageously be used to implement the present invention.

The methods and devices of the present invention have very broad utility, both in the public and private sectors. Any enterprise needs to keep track of how its equipment is being deployed, whether that equipment is used for commercial purposes, for military purposes, etc. RFID devices that are networked according to the present invention can provide necessary information for allowing enterprises to track equipment and products (or groups of products). The information that will be provided by RFID devices that are networked according to the present invention will be of great benefit for enterprise resource planning, including the planning of manufacturing, distribution, sales and marketing.

Using the devices and methods of the present invention, RFID tags and associated RFID devices (such as RFID readers and printers) can form part of a network for tracking a product and its history. For example, instead of waiting in a checkout line to purchase selected products, a shopper who wishes to purchase products bearing RFID tags can, for example, transport the products through a door that has an RFID reader nearby. The EPC information regarding the products can be provided to an RFID network by the reader and can be used to automatically update a store inventory, cause a financial account to be debited, update manufacturers', distributors' and retailers' product sales databases, etc.

Read/write RFID tags can capture information regarding the history of products or groups of products, e.g., temperature and other environmental changes, stresses, accelerations and/or vibrations that have acted upon the product. It will be particularly useful to record such information for products that relatively more subject to spoilage or other damage, such as perishable foods and fragile items. By using the methods of the present invention, this information will be used to update databases maintained by various entities (e.g., manufacturers, wholesalers, retailers, transportation companies and financial institutions). The information will be used not only to resolve disputes (for example, regarding responsibility for product damage) but also to increase customer satisfaction, to avoid health risks, etc.

Figure 2:
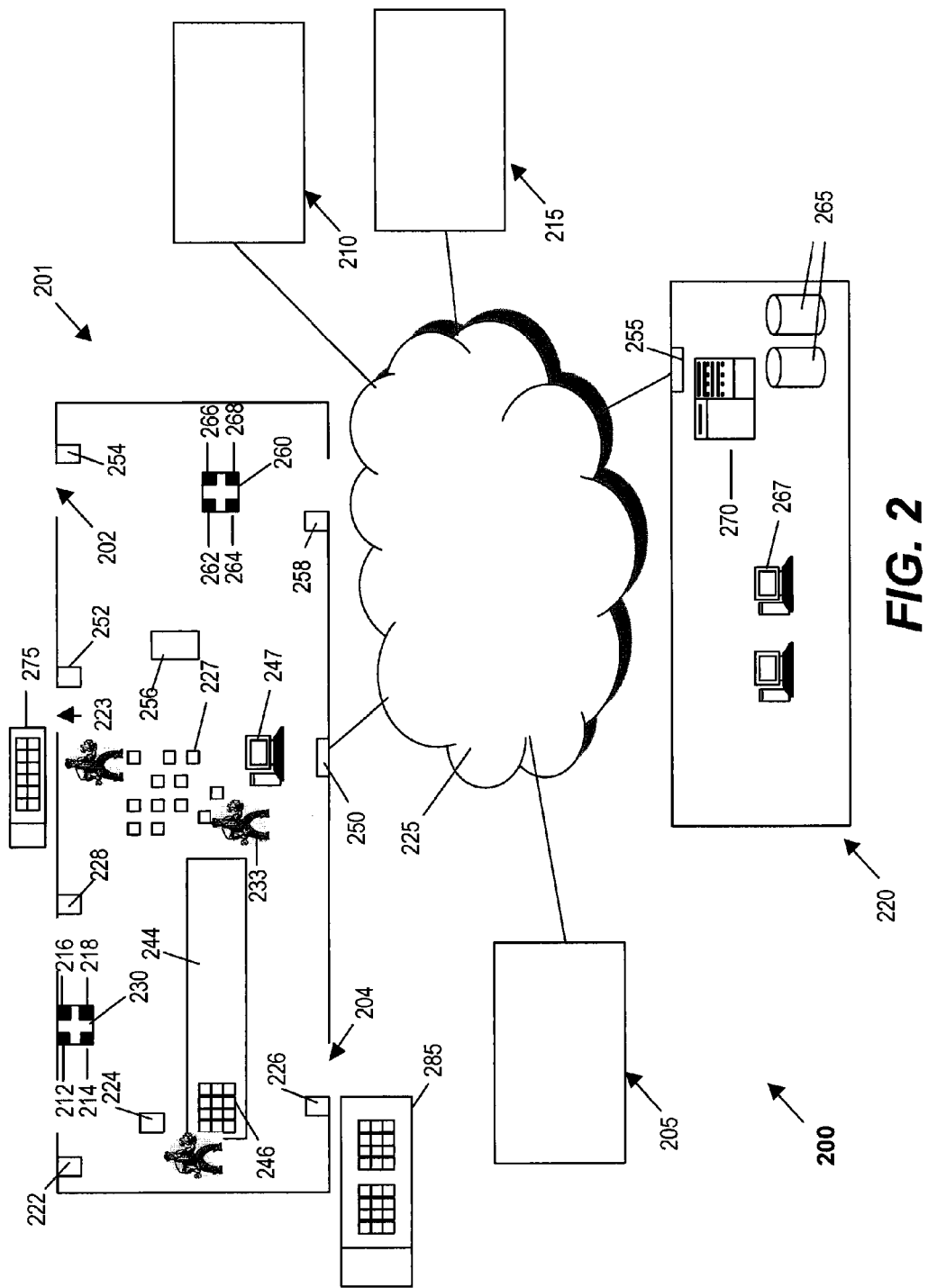
FIG. 2 illustrates an exemplary RFID network according to the present invention.

Some aspects of the invention use a combination of EPC code information and modified versions of existing networking standards for identifying, locating and provisioning RFID devices, such as RFID readers and RFID printers, that are located in a network. An example of such a network is depicted in FIG. 2. Here, RFID network 200 includes warehouse 201, factory 205, retail outlet 210, financial institution 215 and headquarters 220. As will be appreciated by those of skill in the art, network 200 could include many other elements and/or multiple instances of the elements shown in FIG. 2. For example, network 200 could include a plurality of warehouses, factories, etc.

In this illustration, products 227 are being delivered to warehouse 201 by truck 275. Products 227, which already include RFID tags, are delivered through door 223. In this example, RFID reader 252 is connected to port 262 of switch 260. Here, switches 230 and 260 are connected to the rest of RFID network 200 via gateway 250 and network 225. Network 225 could be any convenient network, but in this example network 225 is the Internet. RFID reader 252 reads each product that passes through door 223 and transmits the EPC code corresponding to each product on RFID network 200.

RFID tags may be used for different levels of a product distribution system. For example, there may be an RFID tag for a pallet of cases, an RFID tag for each case in the pallet and an RFID tag for each product. Accordingly, after products 227 enter warehouse 201, they are assembled into cases 246. RFID printer 256 makes an RFID tag for each of cases 246. In this example, RFID printer 256 is connected to port 266 of switch 260. RFID printer 256 could operate under the control of PC 247 in warehouse 201, one of PCs 267 in headquarters 220, or some other device.

RFID reader 224, which is connected to port 214, reads the EPC code of each case 246 and product 227 on conveyor belt 244 and transmits this information on network 200. Similarly, RFID reader 226, which is connected to port 216, reads the EPC code of each case 246 and product 227 that exits door 204 and transmits this information on network 200. Cases 246 are loaded onto truck 285 for distribution to another part of the product chain, e.g., to retail outlet 210.

Each of the RFID devices in network 200 preferably has a "personality" suitable for its intended use. For example, device 252 could cause reassuring tone to sound and/or a green light to flash if an authorized person or object enters door 223. However, device 252 might cause an alarm to sound and/or an alert to be sent to an administrator on network 200 if a product exits door 223 or an unauthorized person enters or exits door 223.

Figure 3:
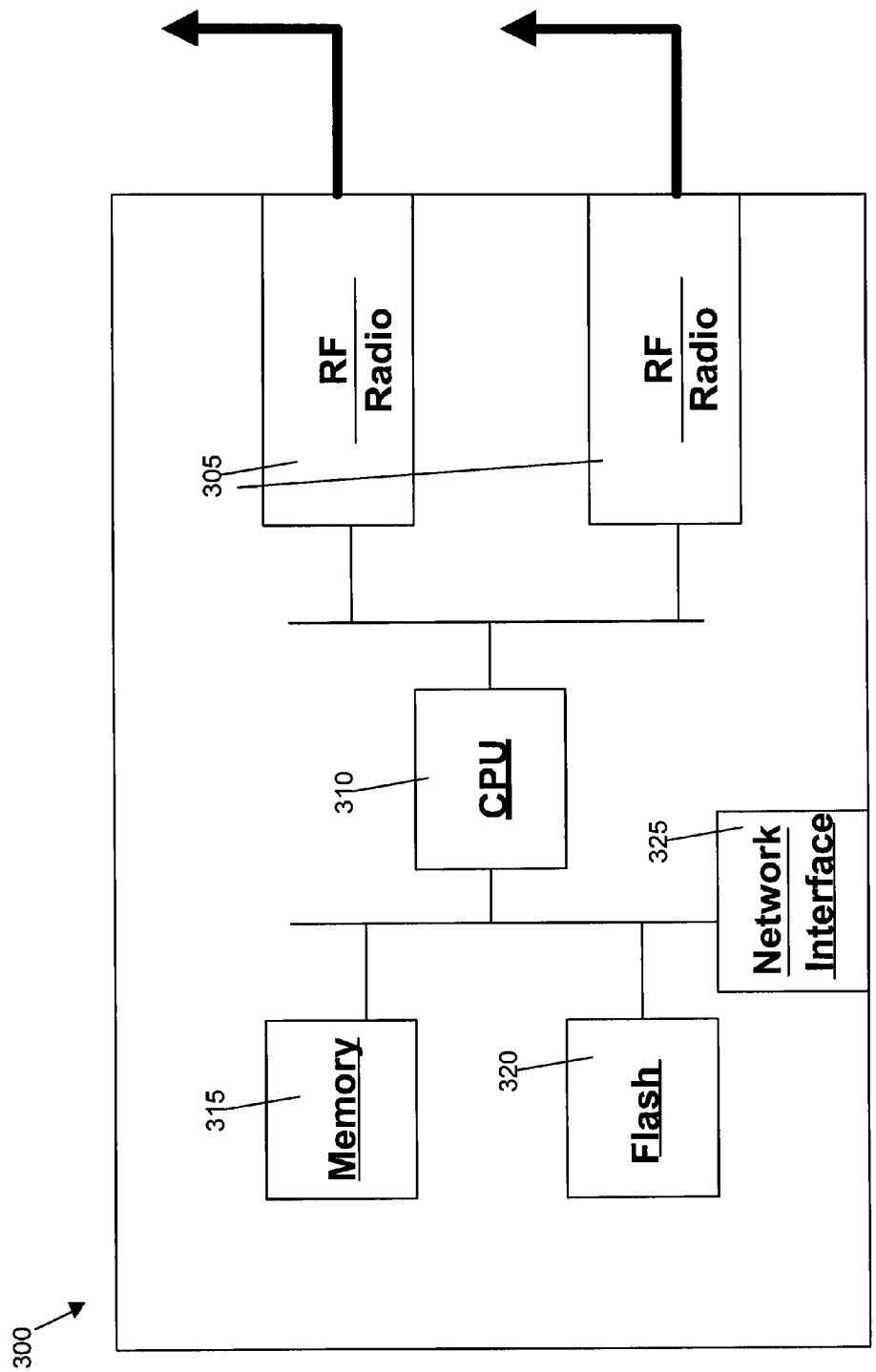
FIG. 3 is a block diagram of an exemplary RFID reader that may be configured to perform some methods of the present invention.

FIG. 3 illustrates an RFID reader that can be configured to perform methods of the present invention. RFID reader 300 includes one or more RF radios 305 for transmitting RF waves to, and receiving modulated RF waves from, RFID tags. RF radios 305 provide raw RF data that is converted by an analog-to-digital converter (not shown) and conveyed to other elements of RFID reader 300. In some embodiments, these data are stored, at least temporarily, by CPU 310 in memory 315 before being transmitted to other parts of RFID network 200 via network interface 325. Network interface 325 may be any convenient type of interface, such as an Ethernet interface.

Flash memory 320 is used to store a program (a "bootloader") for booting/initializing RFID reader 300. The bootloader, which is usually stored in a separate, partitioned area of flash memory 320, also allows RFID reader 300 to recover from a power loss, etc. In some embodiments of the invention, flash memory 320 includes instructions for controlling CPU 310 to form "DHCPDISCOVER" requests, as described below with reference to FIG. 6, to initiate a provisioning/configuration cycle. In some implementations, flash memory 320 is used to store personality information and other configuration information obtained from, e.g., a DHCP server during such a cycle.

However, in preferred implementations, such information is only stored in volatile memory 315 after being received from, e.g. a DHCP server. There are advantages to keeping RFID devices "dumb." For example, a network of dumb RFID devices allows much of the processing load to be centralized (e.g., performed by server 270 of network 200), instead of being performed by the RFID devices. Alternatively, the processing load can be decentralized, but only to trusted devices (such as PC 247 of network 200).

Configuration information is downloaded from, e.g., a central server to memory 315. Updates may be instigated by the central server or selected, trusted devices. New versions of the image file (e.g., the running, base image necessary to operate the RFID device) are copied into flash memory 320. Alternative embodiments of RFID devices implement the methods of the present invention yet lack flash memory.

Newer RFID devices also include dry contact input/output leads to connect to signal lights, industrial networks or the equivalent. These newer RFID devices typically have evolved in the amount of memory, flash, CPU capacity and methods of determination of the number, type and content of RFID tags in their field of view.

Figure 4:
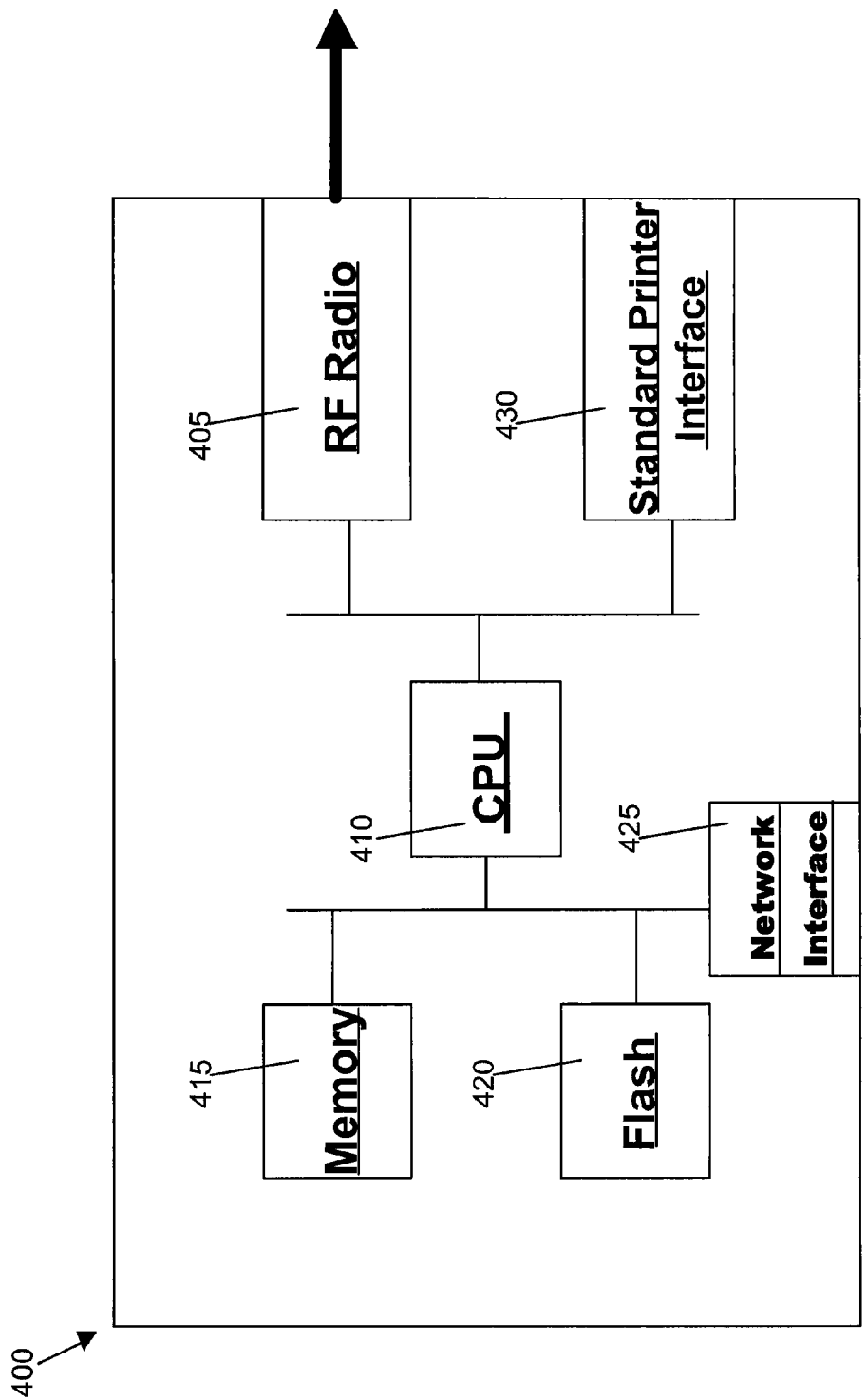
FIG. 4 is a block diagram of an exemplary RFID printer that may be configured to perform some methods of the present invention.

FIG. 4 is a block diagram illustrating an exemplary RFID printer 400 that may be configured to perform some methods of the present invention. RFID printer 400 has many of the same components as RFID reader 300 and can be configured in the same general manner as RFID reader 300.

RFID printer also includes printer interface 430, which may be a standard printer interface. Printer interface prints a label for each RFID tag, e.g. according to instructions received from network 200 via network interface 425.

RF Radio 405 is an outbound radio that is used to send RF signals to the antenna of an RFID tag under the control of CPU 410, thereby encoding information (e.g. an EPC) on the tag's microprocessor. Preferably, RF Radio 405 then checks the encoded information for accuracy. The RFID tag is sandwiched within the label produced by printer interface 430.

Figure 5:
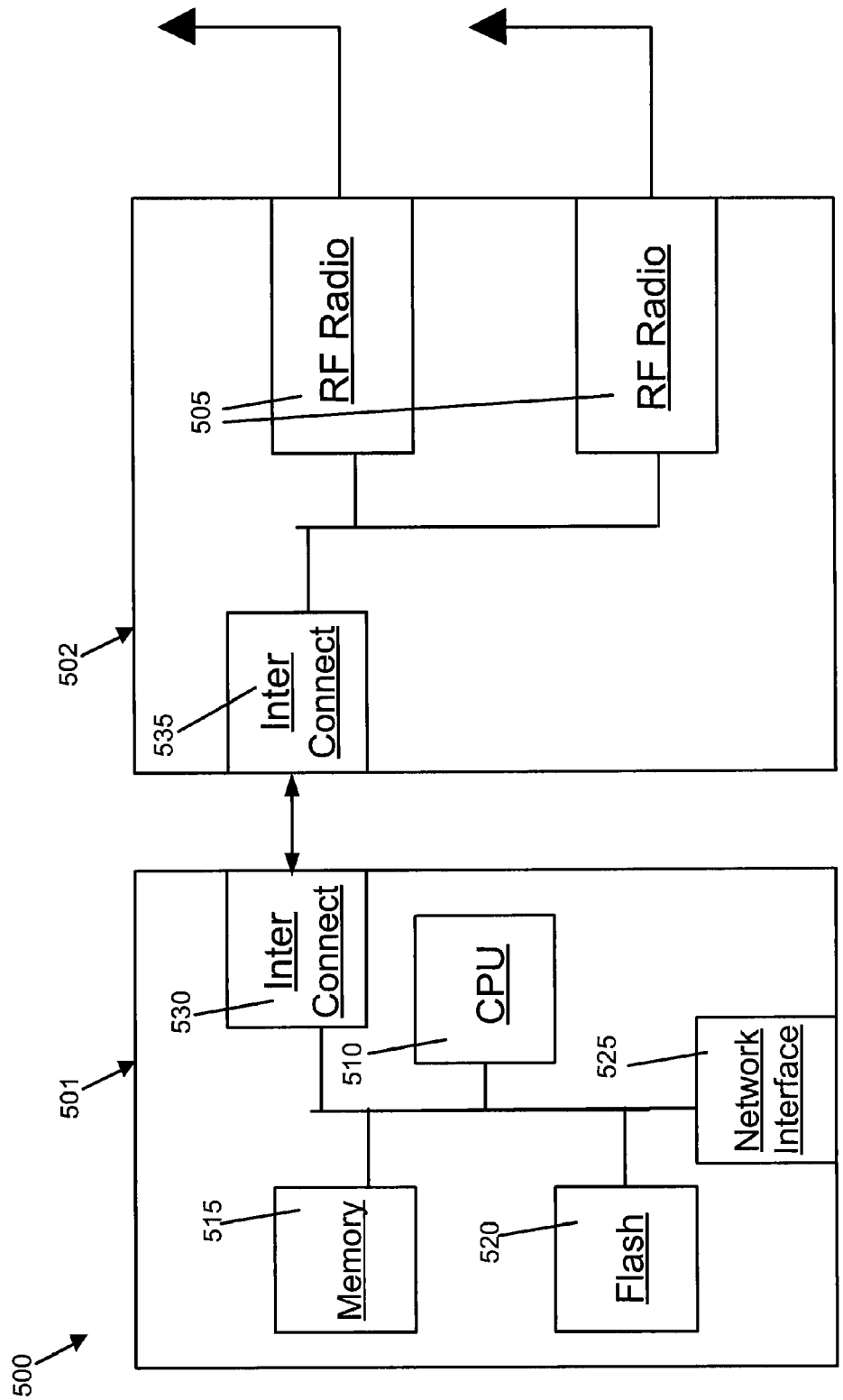
FIG. 5 is a block diagram of an exemplary RFID system that may be configured to perform some methods of the present invention.

FIG. 5 illustrates RFID system 500 that includes control portion 501 and RF radio portion 502. The components of control portion 501 are substantially similar to those described above with reference to FIGS. 3 and 4. Interconnect 530 of control portion 501 is configured for communication with interconnect 535 of RF radio portion 502. The communication may be via any convenient medium and format, such as wireless, serial, point-to-point serial, etc. Although only one RF radio portion 502 is depicted in FIG. 5, each control portion 501 may control a plurality of RF radio portions 502. RFID system 500 may be deployed on a single framework or chassis (e.g., on a forklift) or in multiple chassis.

The DHCP protocol is used in some preferred implementations of the present invention because it offers various convenient features. For example, the DHCP protocol allows pools or "scopes" of TCP/IP addresses to be defined. A DHCP server can temporarily allocate or "lease" these TCP/IP addresses to host devices. An IP address that is not used for the duration of the lease is returned to the pool of unallocated IP addresses. In addition, the DHCP server will provide all related configuration settings, such as the default router, Domain Name Service ("DNS") servers, subnet mask, etc., that are required for the proper functioning of TCP/IP.

For implementations using the DHCP protocol, DHCP Options may be used to pass provisioning information. The DHCP protocol is defined in RFC 2131 and DHCP Options are set forth in, for example, RFCs 2132, 3004 and 3046. RFCs 2131, 2132, 3004 and 3046 are hereby incorporated by reference for all purposes.

In some preferred implementations, an EPC corresponding to an RFID device is put inside a DHCP request sent from the RFID device to a DHCP server. The EPC uniquely identifies the RFID device. Some implementations employ Domain Name Service ("DNS") and dynamic DNS ("DDNS") to allow yet easier identification of RFID devices.

Figure 6:
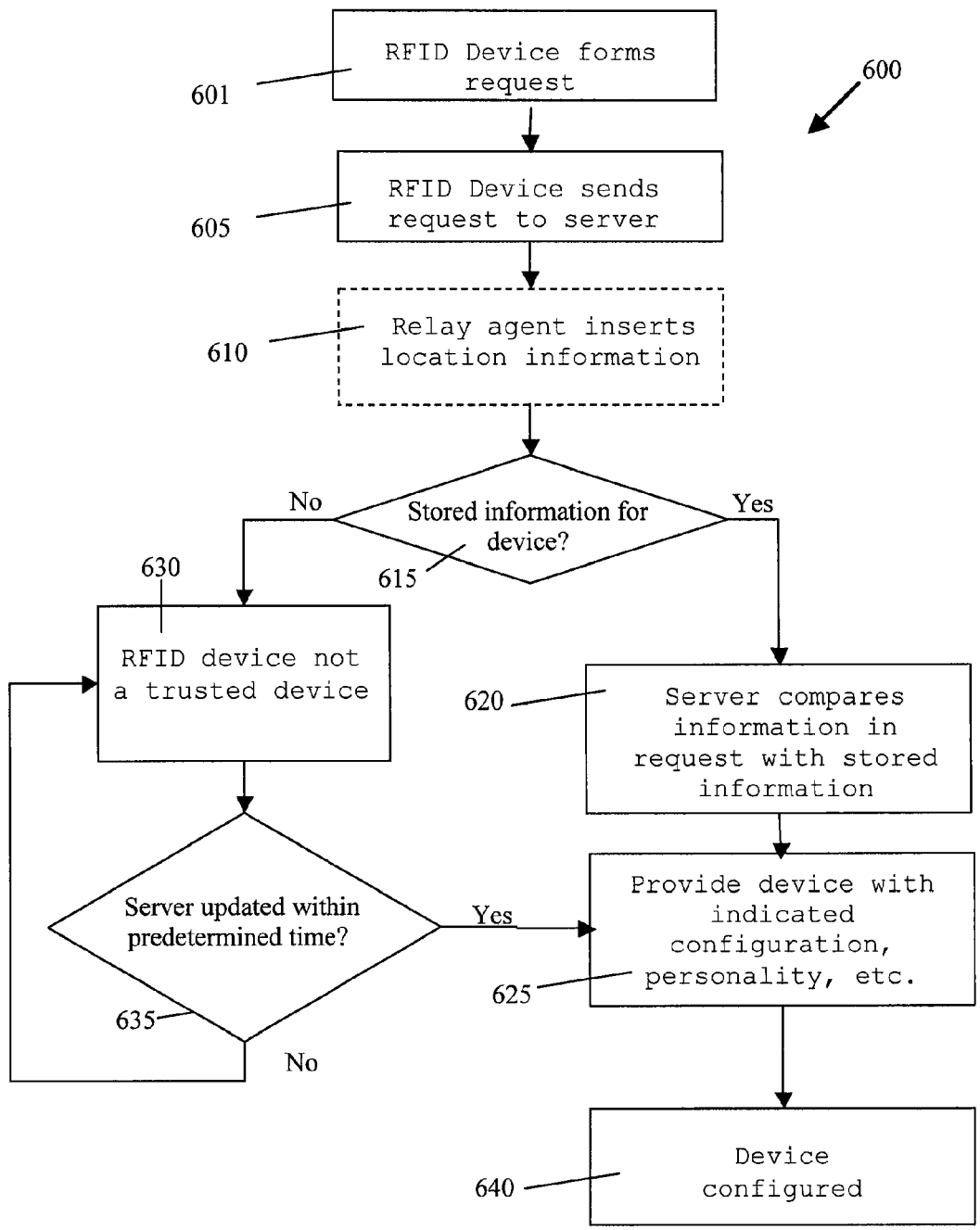
FIG. 6 is a flow chart that provides an overview of some methods of the present invention.

An overview of some such implementations of the present invention will now be described with reference to FIG. 6. It will be appreciated by those of skill in the art that the steps illustrated and described herein are not necessarily performed in the order indicated. Moreover, it will be appreciated that some aspects of the invention may be performed using more (or fewer) steps than are indicated herein. A device that sends out an initiation for an IP address to a DHCP server does so by way of a packet that includes a "DHCPDISCOVER" request. This command includes the media access control ("MAC") address of the device. According to some preferred implementations, the RFID device (e.g., CPU 310 of RFID Reader 300) forms a "DHCPDISCOVER" request packet that includes information in various DHCP Option fields (step 601). The RFID device encodes DHCP "vendor class identifier" Option 60 with a code indicating that the device is an RFID device. In other words, "RFID" will be a new type of "vendor class," encoded in Option 60.

In this example, the RFID device encodes its own EPC in the field reserved for Option 43 (vendor specific information, defined in RFC 2132), Option 61 or Option 125 (vendor-identifying vendor specific information, defined in RFC 3925). The RFID device also encodes a company name, e.g., of the company that supplies, owns or is using the RFID device, in DHCP Option 43.

Option 77 (user class option, defined in RFC 3004) or Option 124 (vendor-identifying class option, defined in RFC 3925) may be used in various ways according to different implementations of the invention. In some implementations, Option 77 or Option 124 will be used to indicate the type of RFID device, e.g., that the RFID device is an RFID reader or an RFID printer. In some implementations, Option 77 or Option 124 can also include information regarding the functionality or "personality" of the RFID device. For example, Option 77 or Option 124 could indicate that the RFID device is an inbound RFID reader, an outbound RFID reader, an RFID reader or printer on an assembly line, a retail store, etc.

Referring once again to FIG. 2, if the request is from RFID device 252, that device would encode information in Option 77 or Option 124 indicating that the device is an RFID reader. In some implementations, Option 77 or Option 124 also indicates that RFID device 252 has a personality suitable for being positioned at an entrance door. Some implementations include more detailed information about the current personality of device 252. For example, Option 77 or Option 124 may indicate that in addition to reading EPC codes and uploading them to the RFID network, device 252 will also cause a green light to flash if an authorized person or object enters door 223 and will cause a red light to flash, an alarm to sound and an alert to be sent to an administrator on the network if a product exits door 223. This information could be encoded, for example, according to a number that corresponds to one of a range of suitable personalities for an RFID reader at an entrance door.

It is desirable to determine and provide location information for RFID devices in a network. Switches and wireless bridges with Ethernet or switch ports are considered static and have assigned names and locations. According to some implementations of the invention, location information is added, for example to an RFID device's DHCPDISCOVER request, by the network device to which the RFID device is attached (step 610).

Some such implementations use DHCP Option 82 (RFC 3046) in a new way to determine the switch port and switch to which an RFID device is connected. For example, a switch may insert the following two information elements into any DHCP request from an attached RFID device: Option 82, Sub-Option 1: Agent Circuit ID and Option 82, Sub-Optionb 2: Agent Remote ID. The Agent Circuit ID is the name or identifier of the switch. The Agent Remote ID is the name or identifier of the switch port.

For example, if the request is from RFID device 226 of FIG. 2, network device 230 adds location information to the request in step 610. Here, the location information would be encoded in Option 82 and would include information identifying network device 230 and port 216, to which RFID reader 226 is attached.

In alternative embodiments wherein the RFID device is capable of determining its own location (e.g., from GPS coordinates), the RFID device may encode location information in the DHCPDISCOVER request or in other commands.

There can be multiple DHCP servers serving the same network. How the servers respond can depend, for example, on whether each server is busy, whether it has served out all its addresses, etc. As RFID pilot networks emerge and develop, they will be interleaved with existing networks, including networks that employ the DHCP protocol. DHCP servers that are provisioning RFID devices (e.g. server 270 of FIG. 2) will respond to "DHCPDISCOVER" commands identifying a class of the device as "RFID," e.g., encoded in Option 60. Those of skill in the art will appreciate that other Options may be used for this purpose. Conversely, DHCP servers that are not provisioning RFID devices will not respond to "DHCP-DISCOVER" commands identifying a class of the device as "RFID." Further, if a non-RFID DHCP server does respond, the RFID device will be able to determine from the DHCP options response that it has received an incomplete DHCP response and will discard it and will prefer responses from RFID DHCP servers. Accordingly, the methods of the present invention allow for the integration of RFID networks within the existing framework of the DHCP protocol.

In step 615, the DHCP server determines whether there is information regarding the requesting device within a database of information regarding known RFID devices, their intended functions, configurations, etc. For example, the DHCP server may inspect the EPC encoded in a request and determine whether there is information for a device with a corresponding EPC in the database.

If so, in step 620, the server compares information in the DHCP request with stored information regarding the RFID device. This information may be in a database (e.g., stored in one of storage devices 265) that is updated, for example, by IT personnel responsible for the RFID network. For example, MAC address information and EPC information can be combined to identify a particular device and its location in a network. Upper-level applications can be notified, for example, that a particular RFID device is available for use.

By inspecting the received data, the server can then determine the type, identity, location and personality (if any) of the RFID device. By comparing the received data with information in the database, the server can then determine, for example, if that precise RFID device has moved and where it is now located. In preferred implementations, the DHCP server may determine the current personality of the RFID device (e.g., by inspecting the Option 77 data) and may compare the current personality with a desired personality.

In step 625, the DHCP server provides the RFID device with configuration information, etc., indicated in the database. For example, the DHCP server may indicate the RFID device's time server, SYSLOG server, the location of the device's configuration files, image files, etc. If the RFID device's current personality does not match the desired personality (or if the request does not indicate a current personality), according to some implementations the DHCP server can provide the device with information (e.g., a computer program, configuration settings, etc.) for enabling the desired personality.

For example, suppose that the EPC code indicates that the device is RFID reader 252 and Option 77 indicates that RFID device 252 has a personality suitable for being positioned at an entrance door. However, the location information in the request may indicate that the requesting device has been moved and is now located at an exit door. Alternatively, the database may indicate that the device is positioned at a door that has been used as an entrance door, but which now will be used as an exit door. This may be a periodic (e.g. hourly, daily, weekly, or monthly) change at a manufacturing facility or warehouse, or may be due to a reconfiguration of the facility.

Therefore, the desired personality for RFID device 252 is now a personality appropriate for an exit door. However, there may be a range of different "exit door" personalities that could be provided to device 252 depending, for example, on the capabilities of the device making the request, the expected uses of the exit door, etc. For example, a device with fewer capabilities (e.g., a smaller memory) may be enabled for relatively simpler exit door functionality. For example, such a device may be enabled to, e.g., make a green light flash when particular type of product is exiting the door and to transmit a notification message to IT personnel and/or cause an alarm to sound if other items are exiting the door.

However, a device with greater capabilities may be enabled for relatively more complex exit door functionality. For example, the device could be enabled to cause a green light to flash if a particular type of product is exiting at an expected time, if the number of products exiting the door is within a predetermined range, etc.

This flexibility in reassigning device personality allows an RFID network to cause the same device type to have multiple personalities based upon location, time of day, or any other suitable criteria. Moreover, this flexibility allows for movement or relocation of devices (whether or not this movement has been approved in advance) and then having devices automatically "repersonalized," as appropriate for the new location. In addition, it allows for specialized functionality on a per device, per locale basis.

However, in some circumstances there may be no information in the database regarding the device. For example, the device may be a new RFID device that has just been activated in the RFID network for the first time (step 630). In this example, the device is placed in a "walled garden" for devices that are not trusted devices. Step 630 may involve assigning the device a non-routable IP address for a predetermined length of time via a DHCPOFFER command. According to some implementations, the DHCP server performs step 630 when there is information in the database regarding the device that is inconsistent with information in the request.

Preferably, step 630 includes notifying an upper-layer application that the device has made the request. In this way, IT personnel responsible for the site within which the RFID device is located will be notified that the RFID device exists and has made a request.

According to some implementations, step 630 involves setting the DHCP Ti timer for a short time interval, for example, 60 seconds. In this example, the RFID device will continue to send DHCP requests to the server every 60 seconds and the server will send "ACKs" to the device until one of two events occurs: (1) the server has been updated (e.g., by IT personnel responsible for the site within which the RFID device is located); or (2) the connection between the server and the RFID device goes down. (Step 635.)

If the server is updated within the predetermined time, this indicates that an IT person has determined that the RFID device making the request is a trusted device. Accordingly, the method proceeds to step 625. If not, the device remains classified as an untrusted device (step 630). Preferably, the device's status may still be changed to that of a trusted (and therefore provisioned) device, e.g., according to subsequent input from IT personnel.

After an initial provisioning configuration cycle (e.g., as described above), RFID devices may need to be reprovisioned or have their personalities changed. As noted above, it is desirable for an RFID device to take on unique provisioning and personalities depending on the desired functionality of the RFID device at a particular time. The desired functionality may be determined according to the location and capabilities of the RFID device. Some devices may be provided with the same personality for a relatively longer time, e.g., months or years. However, it may be desirable to change the personality and/or provisioning information of an RFID device in a relatively shorter time, e.g., prior to the time that a DHCP T1 timer expires. The majority of currently-deployed RFID end devices do not support RFC 3203 (DHCP Reconfigure Extension).

Figure 7:
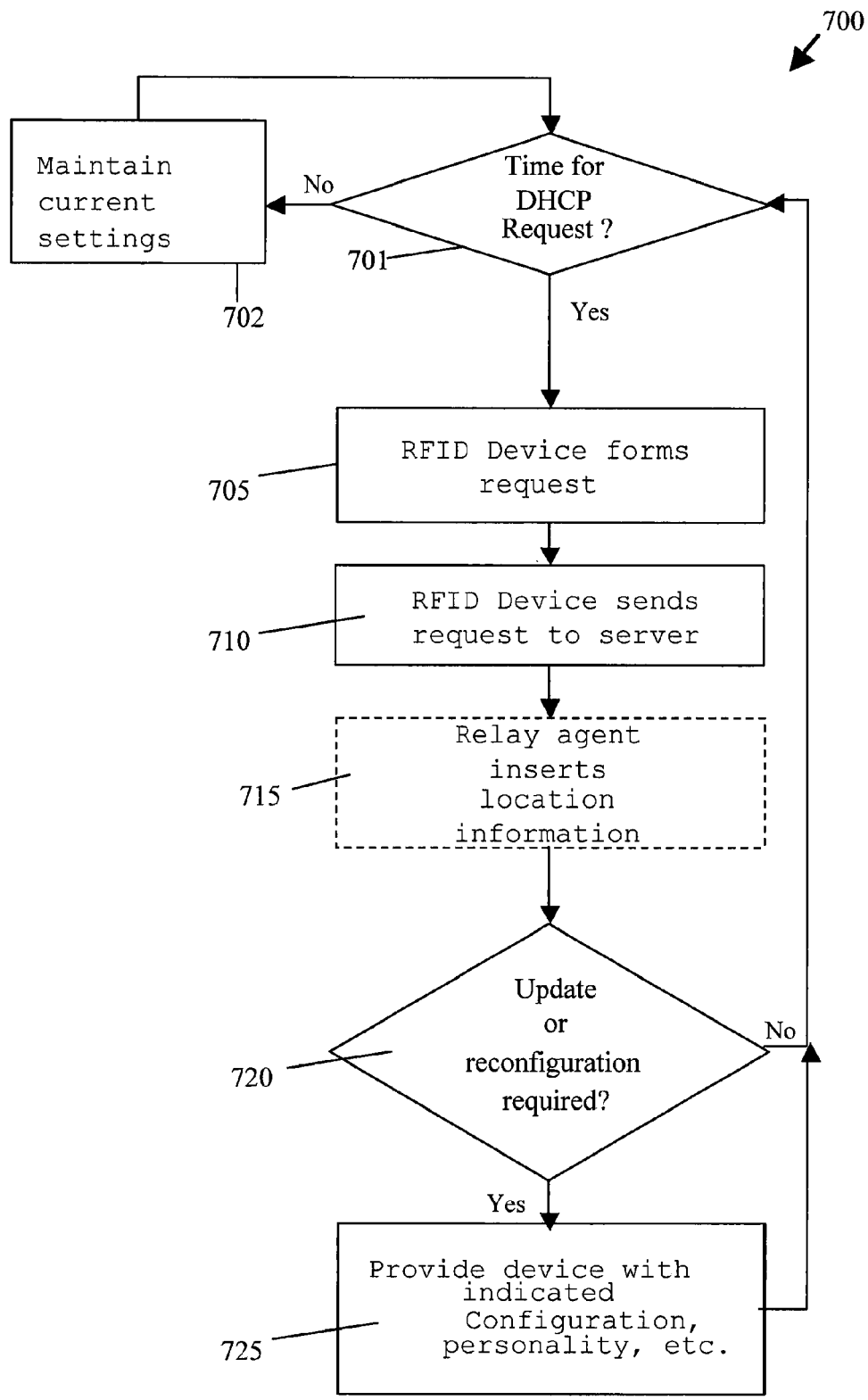
FIG. 7 is a flow chart that provides an overview of alternative methods of the present invention.

The present invention encompasses a variety of methods for accomplishing these goals. One such method will now be described with reference to FIG. 7. Method 700 begins with a determination of whether to send information to a network device regarding the current personality of the RFID device (step 701). Here, the RFID device will send the information to a DHCP server if a predetermined period of time has elapsed. In this example, the predetermined period of time is one hour, but it could be any convenient period of time.

If it is time for another DHCPREQUEST or DHCPINFORM message to be sent to the DHCP server, the RFID device forms the request (step 705). If not, the current personality is maintained (step 702). In this example, the information will be sent in a DHCP request (RFC 2131) combined with DHCP Option 125, Option 61 or Option 43 set to the RFID device's EPC (or equivalent) and Option 77 set to the RFID device's current personality. Using DHCPREQUEST, DHCPINFORM and DHCP Options, the RFID device is able to pass current identification, provisioning and personality information.

In this example, a cached secret (e.g., hashed with the contents of the DHCP message including the client EPC) will be included with the DHCP request in order to secure the response. The secret could be provided, for example, during an earlier provisioning stage, e.g., the initial provisioning stage of the RFID device. The secret could be used in the DHCPINFORM validation process and for other processes.

The request is sent in step 710. Preferably, a relay agent updates the request with location information, as described above (step 715).

In step 720, the server compares the information in the request with stored information (e.g., in a lookup table or a database) to determine whether an update or a complete reconfiguration of the RFID device is required. If not, the process returns to step 701. If so, the server provides the RFID device with the necessary update and/or reconfiguration information (step 725).

The RFID device triggers the update and/or reconfiguration determination in the foregoing example. However, in other implementations, another device (e.g., the DHCP server) and/or a person initiates this determination. For example, the DHCP server could initiate a periodic process of comparing a desired RFID device personality with the last known RFID device personality. Alternatively, an IT worker could send information (e.g., to the DHCP server, to the RFID device or to another device) indicating a desired change in personality.

According to some implementations of the invention, a DHCP server causes an update or a complete reconfiguration using a DHCPFORCERENEW command as defined by RFC 3203, which is hereby incorporated by reference in its entirety. The CPU of the RFID device registers the DHCP-FORCERENEW command and starts a new provisioning cycle, for example as described above with reference to FIG. 6.

In order to secure the command, in this example a cached secret is hashed within the command. For example, the secret can be included with the EPC code of the RFID device.

One method for creating an authentication key is as follows:

MD-5 (EPC, Challenge, Secret)

By adding in the variable of a random Challenge, no replay attacks of the hash code could be used. Because the EPC is included, the authentication can be further validated to come from a specific device.

The foregoing methods allow for unique determination and provisioning of RFID devices by time of day, not simply by device "type," "class" or "location." Moreover, the foregoing methods allow for ongoing verification/auditing of what the end device roles are. In addition, these methods allow operation managers to have enterprise resource planning systems control end devices to allow for increased functionality.

Figure 8:
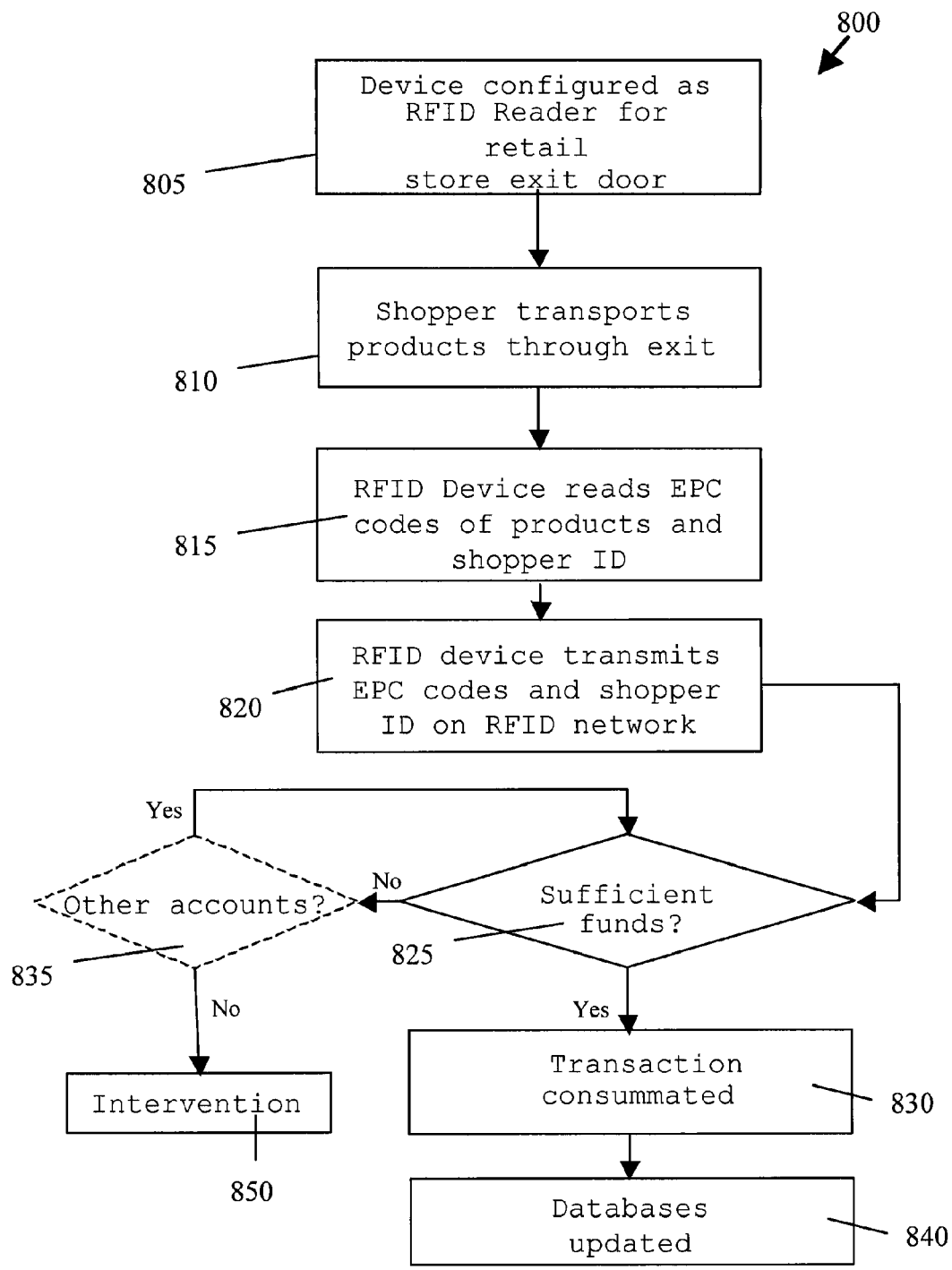
FIG. 8 is a flow chart that provides an overview of some implementations of the present invention.

FIG. 8 is a flow chart that illustrates an exemplary business application of the present invention. Those of skill in the art will appreciate that the example described below with reference to FIG. 8 is but one of many applications of the invention.

In step 805, an RFID device has already been provisioned according to one of the previously-described methods. The condition of the RFID device is comparable to that of a device at step 640 in method 600, shown in FIG. 6 and described above. In this example, the RFID device is an RFID reader that is positioned near an exit door of a retail store. Therefore, in the previous steps, the device has been provisioned with a personality that is appropriate for its role.

In step 810, a shopper exits the door with a number of selected products. In step 815, the RFID reader reads the RFID tags of each product and extracts the EPC codes and related product information (e.g., the price of each product).

The RFID reader also reads an RFID tag that identifies the shopper and the shopper's preferred account(s) that should be debited in order to purchase the products. For example, the shopper may have an RFID tag embedded in a card, a key chain, or any other convenient place in which this information is encoded. The accounts may be various types of accounts maintained by one or more financial institutions. For example, the accounts may be one or more of a checking account, savings account, a line of credit, a credit card account, etc. Biometric data (e.g., voice, fingerprint, retinal scan, etc.) from the shopper may also be obtained and compared with stored biometric data in order to verify the shopper's identity.

In step 820, the RFID reader transmits the product information, including the EPC codes, on the RFID network. In this example, the information is first sent to a financial institution indicated by the shopper's RFID tag.

In step 825, the financial institution that maintains the shopper's selected account determines whether there are sufficient funds (or whether there is sufficient credit) for the shopper to purchase the selected products. If so, the shopper's account is debited and the transaction is consummated (step 830).

In this example, the shopper has the option of designating one or more alternative accounts. Accordingly, if the first account has insufficient funds or credit, it is determined (e.g., by a server on the RFID network) whether there the shopper has indicated any alternative accounts for making purchases (step 835). If so, the next account is evaluated in step 825. If it is determined in step 835 that there are no additional accounts designated by the shopper, in this example some form of human intervention takes place. For example, a cashier of the retail store could assist the shopper in making the purchases in a conventional manner.

If some or all of the products are purchased, information regarding the purchased products (including the EPC codes) are transmitted on the RFID network. For example, this information is preferably forwarded to one or more devices on the RFID network that are configured to update one or more databases maintained by the retail store or the manufacturers/producers, distributors, wholesalers, etc., of the purchased products (step 840). In some implementations, information regarding the shopper is also transmitted on the RFID network (e.g., if the shopper has authorized such information to be released). This product information (and optionally shopper information) may be used for a variety of purposes, e.g., in the formation of various types of business plans (e.g., inventory re-stocking, marketing, sales, distribution and manufacturing/production plans).

Some implementations of the invention provide alternative methods of provisioning devices, including but not limited to RFID devices. Some such methods will now be discussed with reference to FIG. 9 et seq.

Figure 9A:
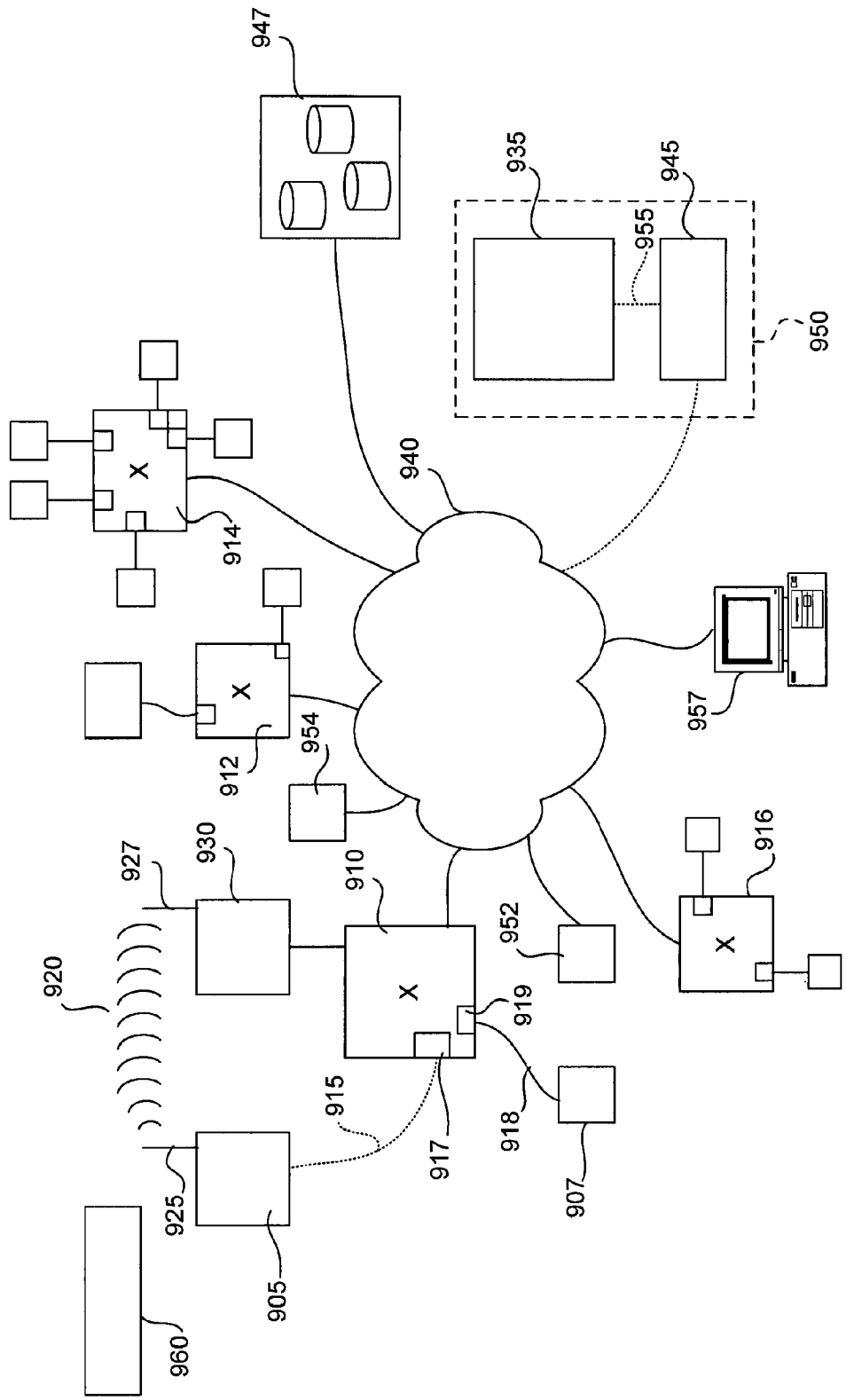
FIG. 9A is a network diagram that illustrates an alternative embodiment of the invention.

In FIG. 9A, RFID reader 905 is in communication with switch 910. This communication may be via a wired link, as illustrated by optional link 915 between RFID reader 905 and port 917. Alternatively, the communication may be via a wireless link, e.g., via wireless link 920 between antenna 925 of RFID reader 905 and antenna 927 of access point 930. RFID device 907 is connected via line 918 to port 919.

Switch 910, as well as switches 912, 914 and 916, can communicate with DHCP server 935 via network 940. Network 940 may be any convenient type of network, but in this illustration at least part of network 940 includes a portion of the Internet.

In some implementations of the invention, DHCP server 935 performs tasks that, in other implementations, are performed by device 945. Device 945 may be one of various types of computing devices, including a host device, a server, etc. In some implementations, device 945 is a Lightweight Directory Access Protocol ("LDAP") server. LDAP is a set of protocols for accessing information directories and is based on the standards contained within the X.500 standard, but is significantly simpler. Unlike X.500, LDAP supports TCP/IP. In some implementations, DHCP server 935 and device 945 are in the same chassis 950. In other implementations, DHCP server 935 and device 945 are in direct communication (as shown by link 955) or communicate via network 940.

Accordingly, RFID reader 905 can read RFID tags (including but not limited to location tag 960) and transmit them to devices in communication with network 940. Preferably, location tag 960 is positioned in a relatively fixed location, e.g., is mounted on a wall, a door frame, or another structural element of a building. In alternative embodiments, location tag 960 is portable.

Location tag 960 includes what will sometimes be referred to herein as "location data," "location information" or the like. The location information may include any convenient type of absolute or relative coordinate, positioning, cartographic or similar information and/or information from which such information may be derived. For example, in some implementations location tag 960 includes latitude/longitude, X,Y coordinate information and/or elevation information. In other implementations, location tag 960 includes "civil address" information, which may include street address, building, floor, room/area and/or other such information.

Alternatively, the location information may be in the form of a code, such as a numerical or alphanumeric code, from which absolute location information (such as coordinate, latitude/longitude, civil address, etc.) may be derived. For example, a data structure accessible by DHCP server and/or device 945 may include codes and corresponding absolute location information. Accordingly, DHCP server and/or device 945 may access the data structure and determine absolute location information that corresponds to a code encoded in location tag 960. The data structure may be a look-up table, a database, etc. The data structure may be stored in a local memory or in one or more of networked storage devices 947.

Middleware servers 952 and 954 provide data collection and filtering services, such as taking out redundancies, searching for particular RFID tag reads, etc. Accordingly, only a portion of the data received by the middleware servers is routinely made available to higher-level applications. Middleware servers are sometimes referred to herein as "ALE" (application level event) devices or the like.

IT personnel monitoring the system, troubleshooting, etc., may use a device such as management station 957, which is a desktop computer in this example. A management station may be configured to receive, display and analyze raw and/or filtered reads and to perform follow-up tasks such as interrogating devices in the network.

Figure 9B:
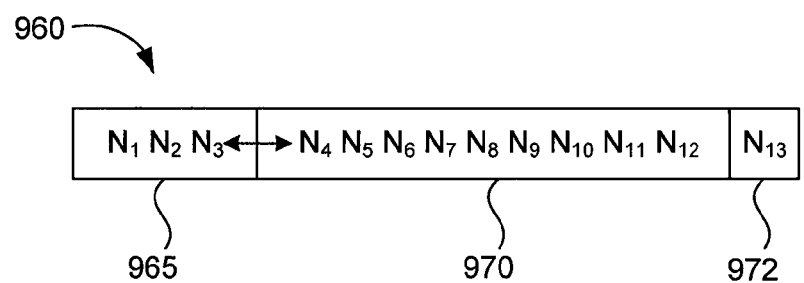
FIG. 9B illustrates a Global Location Number ("GLN").

Location tag 960 may be encoded in any convenient manner, including by proprietary methods and/or methods that conform, at least in part, to existing standards. In general, it is preferable to deploy location tags that are encoded according to existing standards in order to simplify programming of related devices, to avoid non-uniqueness problems and generally to lower the costs of implementing the present invention. Location tag 960 may be formed, e.g., as an RFID tag or as any type of bar code. One example of a format for at least a portion of location tag 960 is shown in FIG. 9B. Here, location tag 960 is in the general format of a Global Location Number ("GLN"). Some exemplary GLN formats are defined, for example, in the "Global Location Number (GLN) Implementation Guide," (Uniform Code Council, 2002), which is hereby incorporated by reference for all purposes. Accordingly, location tag 960 includes a 13-digit GLN. Field 965 is a company prefix field, which indicates the prefix assigned to an entity by the Uniform Code Council or an EAN member organization. Field 972 is a check digit field that contains a one-digit number used to ensure data integrity.

The length of location reference field 970, which is a nine-digit field in this example, varies according to the length of the assigned company prefix field 965. Location reference field 970 may be assigned to identify uniquely a selected location. Accordingly, location reference field 970 may be customized according to an organization's desires and/or requirements. In the example shown in FIG. 9C, location reference field 970 has been defined by an entity to according to a 3-digit building field 975, a 2-digit floor field 980, a 1-digit function field 985 and a 3-digit area field 990. In this example, the location is a particular door in a receiving area of a warehouse.

Figure 10:
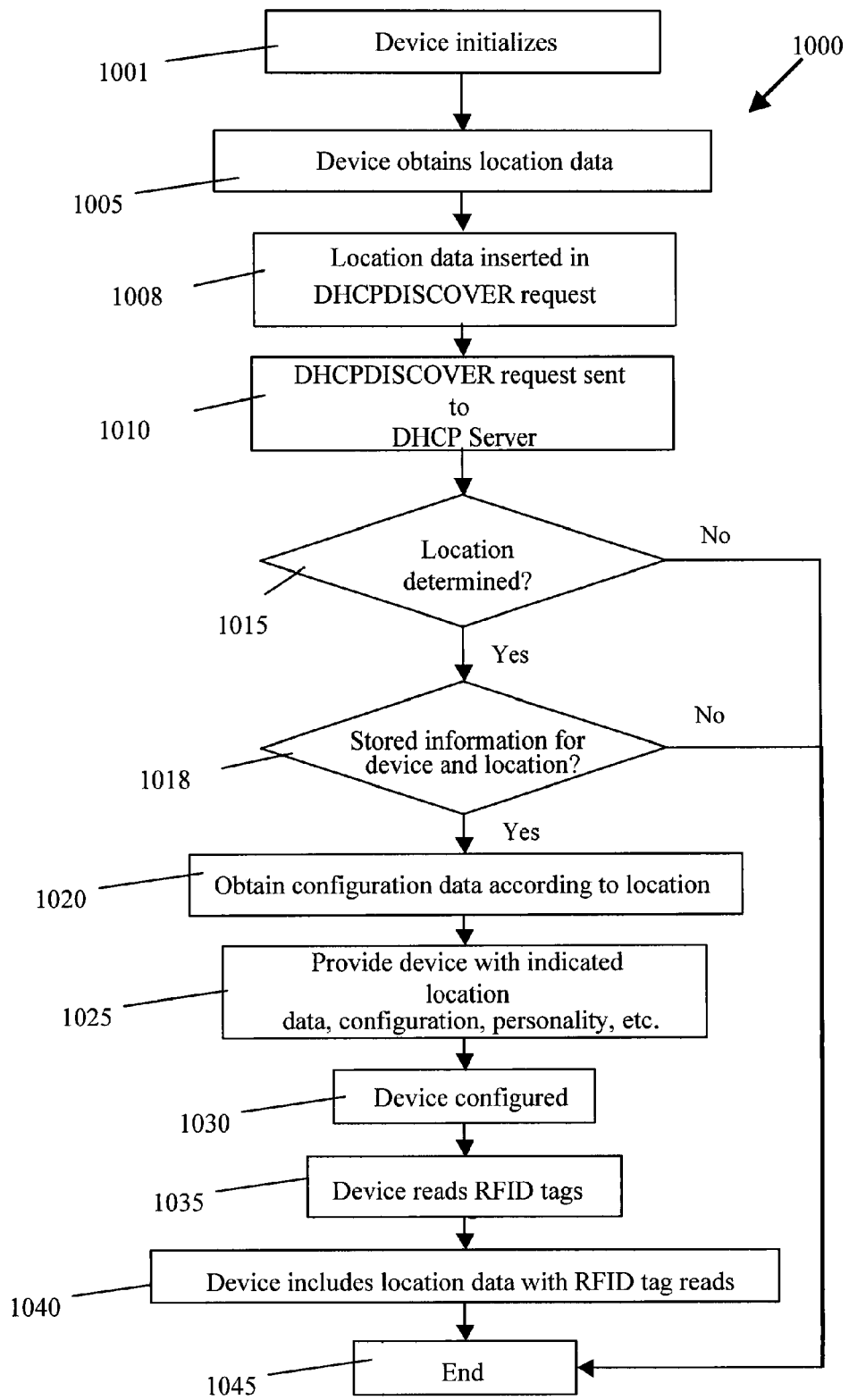
FIG. 10 is a flow chart that outlines an alternative method of the invention.

FIG. 10 is a flow chart that outlines method 1000 according to the invention. In step 1001, a device initializes. According to method 1000, the device obtains location data before the device is configured with an IP address and other network configuration information. (Step 1005.)

In some implementations of the invention, the location data are obtained in step 1005 by reading a location tag that is positioned nearby. Accordingly, location tags have previously been positioned in locations where devices were expected to be used. The identifiers and locations of the location tags have preferably been recorded in a central management system. In some such implementations, when a device (e.g., a wireless RFID reader) is first turned on, the device prompts the user to "swipe" the reader past a location tag. Swiping may not be necessary if, for example, the location tag is an RFID tag and the reader is capable of reading tags at a sufficient distance.

In alternative implementations, the location data are obtained in step 1005 according to other methods, e.g., from an associated device that has Global Positioning System ("GPS") capability. In some such implementations, the device itself includes GPS functionality.

In step 1008, the location data are included in an option field of the DHCPDISCOVER request, for example in option 43 (RFC 2132) or option 125 (RFC 3925). These RFCs are hereby incorporated by reference for all purposes. The DHCPDISCOVER request is then sent to a DHCP server. (Step 1010.)

In step 1015, it is determined whether the device's location can be determined from the location data in the DHCPDISCOVER request. The determining step includes extracting the location data from an option field of the DHCPDISCOVER request. As noted above, in some implementations the location data may be a code that can be used to cross-reference objective location data that could be meaningful for the purpose of device provisioning. In other implementations (e.g., as described above with reference to FIGS. 9B and 9C), such objective location data are encoded in the request itself.

The process of determining and/or evaluating the location data may be performed by the DHCP server itself (e.g., by DHCP server 935 of FIG. 9A) or may be performed, at least in part, by another device (e.g., by device 945 of FIG. 9A). Information relevant to steps 1015, 1018 and 1020 maybe stored by one of these devices, by a local storage device or by networked storage devices 947. (See FIG. 9A.) If objective location data can be determined in step 1015, the process continues to step 1018. If not, the process ends.

Figure 9C:
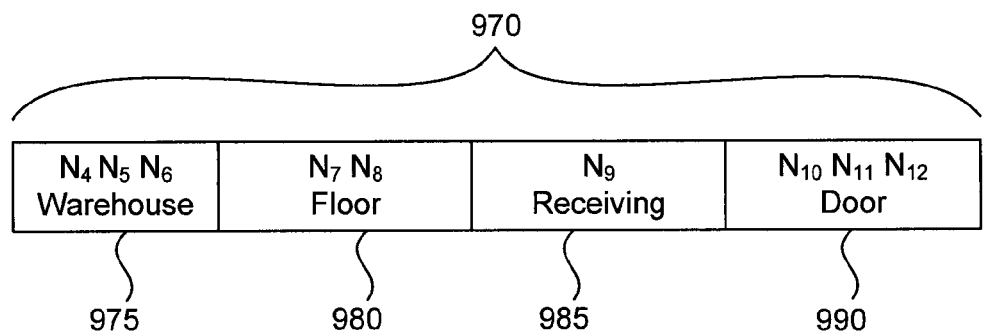
FIG. 9C illustrates one exemplary location reference field of the GLN illustrated in FIG. 9B.

In this example, objective location data were encoded as shown in FIG. 9C and it is determined in step 1015 that the device is located near the indicated receiving door of a particular floor of a warehouse. In step 1018, it is determined whether there are stored configuration data that correspond to the objective location data determined in step 1015. Either step 1015 or step 1018 (in this example, step 1018) also involves determining a device type, e.g., according to methods discussed elsewhere herein. Here, it is determined in step 1018 that the device is a particular type of RFID reader.

Moreover, it is determined in step 1018 that configuration data appropriate for that type of RFID device and for the location determined in step 1015 have previously been stored. In this example, it is determined in step 1018 that location data for the device, such as a logical name, are also available.

Accordingly, in step 1020 an appropriate IP address, other network configuration information, location data and an operating system image for the RFID reader are obtained. Such data will sometimes be collectively referred to herein as "configuration data" or the like. In this example, an appropriate device personality has also been stored. This personality is determined in step 1018 and is provided in step 1025 through a DHCP message exchange, using one or more DHCP Options. For example, coordinate based location information can be returned in the "DHCP Option for Coordinate-based Location Configuration Information" (RFC 3825), which is hereby incorporated by reference. Civic address location information can be returned in the "DHCP Option for Civic Addresses Configuration Information" (draft-ietf-geopriv-dhcp-civil-04), which is also incorporated by reference. Other location tags can be returned as a "Vendor-Identifying Vendor Option" (RFC 3925), which has already been incorporated by reference herein. A logical name could be returned via DHCP Option 12.

DHCP and DNS can accomplish provisioning based on location. The DHCP server could return a "random" address from a pool of addresses and also could return a specific host name to the RFID reader. Middleware typically has a pre-configured specific IP address or specific host name, corresponding to a particular RFID reader. It will be apparent to those of skill in the art that hard-coding a specific IP address in the middleware will not work if the DHCP server is handing out "random" IP addresses from a pool.

Therefore, in some implementations of the invention, the specific host name is hard-coded within the middleware server. When the DHCP server hands back a "random" IP address corresponding to a particular RFID reader, it can update a dynamic DNS server. The DNS server binds the "random" IP address to the specific host name. In this case, because the DHCP server assigned the host name to the device based upon the location of the device (e.g., from the DHCP Option 82 information) one can ensure that the IP address is bound to the correct host name.

The device is configured accordingly, e.g., as described elsewhere herein. (Step 1030.) In some preferred implementations, a middleware server will instruct the reader to include location information within each tag read, in whatever form the middleware server designates, e.g., as a location EPC, as geographic coordinates or as a logical name of the reader (i.e. device name or host name). For example, the middleware server could send XML commands instructing the reader to set its name to a logical name (e.g., "dock door 100"). In some such implementations, the logical name will include additional civic address information (e.g., "warehouse A") and/or cartographic information, such as (x,y,z) coordinates, latitude/longitude, etc.

Location data received in the provisioning process are preferably stored locally, e.g., in a memory of each provisioned RFID reader. When the middleware initiates a session to the reader, it queries the DNS server using the hard-coded host name. The DNS server responds with the IP address bound to that host name and the middleware is able to connect to the RFID reader.

After RFID readers are provisioned and configured according to methods of the present invention, the RFID readers read RFID tags (step 1035) and transmit RFID data from the RFID tags (sometimes referred to herein as "raw reads" or the like) to middleware servers, such as middleware servers 952 and 954 of FIG. 9A. In some preferred implementations of the invention, an RFID reader will also encode and transmit location data (such as a logical name) obtained during the provisioning process, along with the raw reads. (Step 1040.) An example of such a read is described below with reference to FIG. 13.

In some such implementations, these location data are transmitted with every raw read. As noted elsewhere herein, a logical name has meaning without the need to cross reference, e.g., a device ID number. Accordingly, a logical name would have meaning to IT personnel monitoring the system, troubleshooting, or otherwise trying to determine the significance of the reads. Such tasks may be performed, for example, via management station 957.

Some implementations of the invention use alternative methods of determining a device's location. For example, some methods that are suitable for wireless devices use location determination techniques that are outlined in one or more of the IEEE 802.11 specifications, (e.g., 802.11b), which are hereby incorporated by reference for all purposes.

Figure 11:
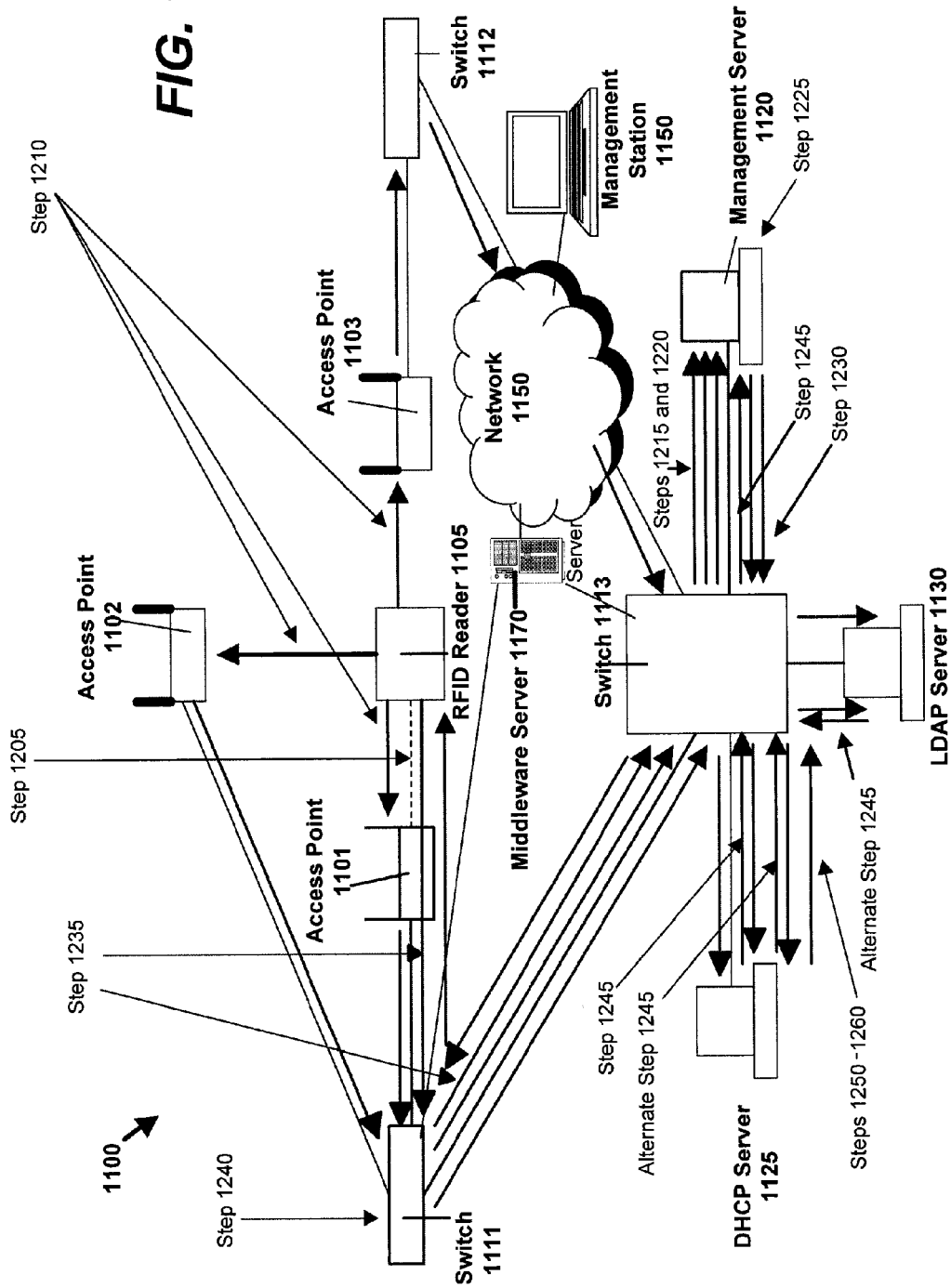
FIG. 11 is a network diagram that illustrates another embodiment of the invention.

Some such implementations will now be described with reference to the network diagram of FIG. 11 and the flow chart of FIG. 12. FIG. 11 depicts wireless device 1105, which is a wireless RFID reader in this example. In alternative implementations, wireless device 1105 may be another type of wireless device, such as a portable digital assistant or a laptop computer having a wireless interface. The signals from wireless device 1105 can be detected by wireless access points ("WAPs") 1101, 1102 and 1103, which are in communication with switches 1111 and 1112.

Figure 12:
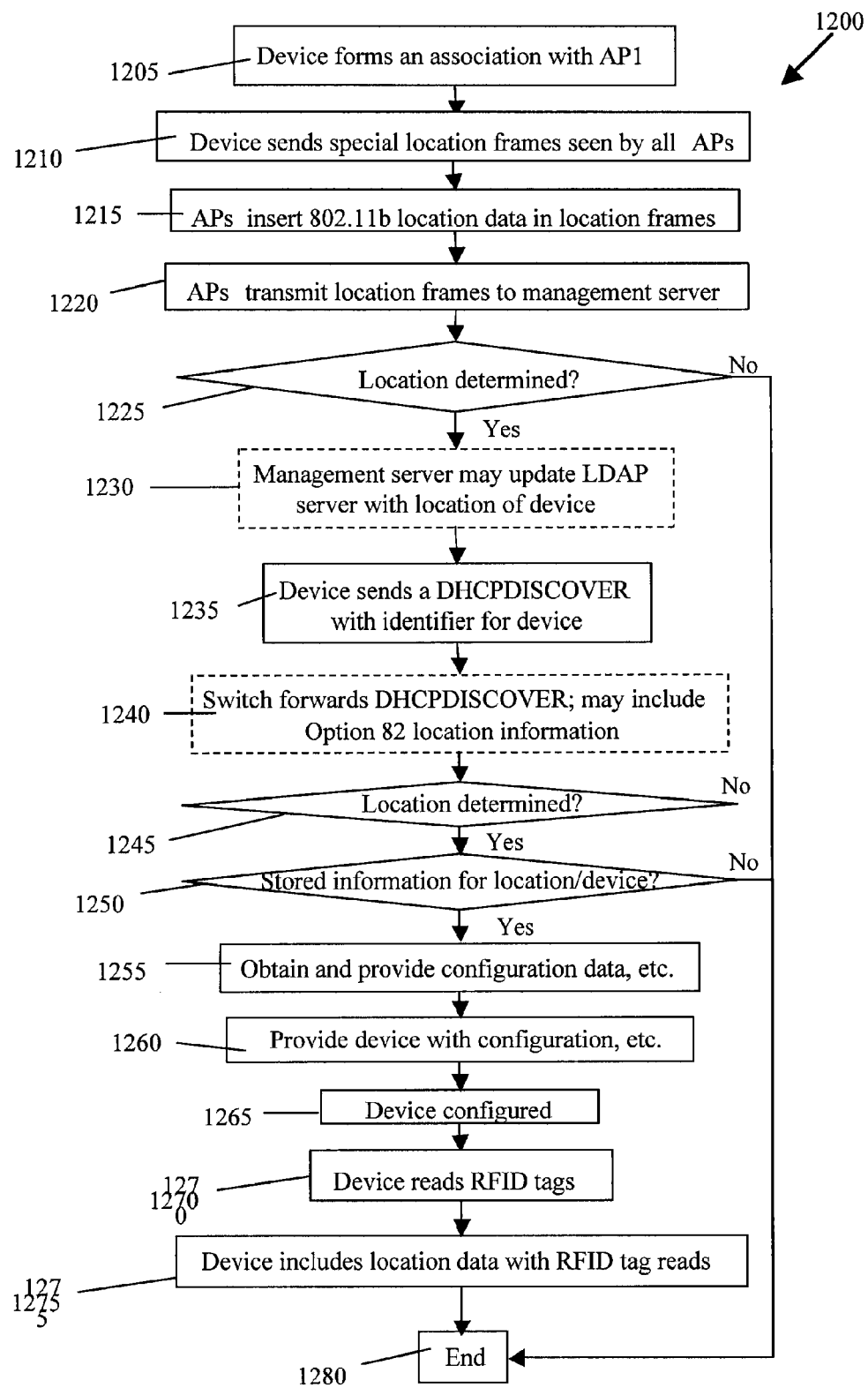
FIG. 12 is a flow chart that outlines yet another method of the invention.

According to method 1200 of FIG. 12, wireless device 1105 initializes and forms an association with access point 1101 (step 1205). All 802.11 devices associate with only a single access point at any one time. Therefore, wireless device 1105 can only associate with a single access point. Access points 1102 and 1103 can "see" wireless device 1105 because a wireless network is a shared medium. However, wireless device 1105 directs its traffic towards access point 1101, with which it has an association.

According to the 802.11b specification, a wireless device will periodically send out a special wireless frame (packet) which is specifically understood to go to all access points. The special frame, which is typically implementation dependent, usually contains an identifier for the particular wireless device. Such special frames will be referred to herein as "location frames" or the like. Accordingly, in step 1210 wireless device 1105 sends out a location frame that is received by access points 1101, 1102 and 1103. The location frame includes an identifier, which could be the MAC address of wireless device 1105, some other identification number, an EPC value coded into the RFID device, etc.

When an access point receives a location frame, the access point forwards the location frame to a management server that aggregates the information from various access points. Each access point may insert a timestamp of when it received the frame and/or the power level (Received Signal Strength Indicator or "RSSI") of the received frame before forwarding it to the management server. These data will sometimes be referred to herein as "IEEE 802.11b location data" or the like.

Such IEEE 802.11b location data may include what could be termed "triangulation data," in that the data may be used to locate the wireless device by triangulation techniques. However, some types of IEEE 802.11b location data are not, strictly speaking, triangulation data. Instead, these data reference other location information, e.g., system map data.

Accordingly, in step 1215, access points 1101, 1102 and 1103 insert IEEE 802.11b location data into the location frames received from wireless device 1105 and forward the location frames to management server 1120. Therefore, management server 1120 will receive multiple frames containing the device identifier for wireless device 1105 from different access points. Switch 1113 is shown in FIG. 11 to be hard wired to management server 1120, DHCP server 1125, LDAP server 1130 and switch 1111. Switch 1113 is depicted as being in communication with switch 1112 via network 1160, which is a local area network in this example. However, it will be appreciated by those of skill in the art that this is merely a simple example of how these and other devices of network 1100 may communicate. For example, switch 1113 may communicate with one or more of management server 1120, DHCP server 1125, LDAP server 1130, switch 1112 and switch 1111 via a network such as an intranet and/or the Internet.

In step 1225, management server 1120 attempts to determine the location of wireless device 1105 using the IEEE 802.11b location data in the location frames. The access points have preferably been mapped into the management server, so their location is known. Based upon the IEEE 802.11b location data (e.g., the RSSI or timestamp) in the special frames, the management server can use algorithms to determine the location of wireless device 1105.

Management server 1120 may show the location of wireless device 1105 on a map that was pre-configured in a management station at the same time the access points were added to the management station. This location could be indicated in terms of a geographical coordinate. Alternatively, or additionally, management server may be configured to designate portions of a map to correspond to a predetermined location name such as "dock door 101" or "back stockroom."

If management server 1120 cannot determine the location of wireless device 1105, method 1200 ends. The location may nonetheless be determined by alternative methods described herein. However, if management server 1120 can determine the location of wireless device 1105, management server 1120 will store the location and may update a memory of another device, e.g., of LDAP server 1130. (Optional step 1230.)

In step 1235, wireless device 1105 sends a DHCPDISCOVER request, with a device identifier, to DHCP server 1125. Unlike the special location frame, the DHCPDISCOVER request only goes to the access point with which wireless device 1105 has an association (access point 1101). Switch 1111, to which access point 1101 is connected, may optionally add location data as described elsewhere herein. For example, switch 1111 may include location data in Option 82. Switch 1111 forwards the DHCPDISCOVER request to DHCP server 1125 via switch 1113. In some implementations, switch 1113 functions as a relay agent and inserts a gateway address in the DHCPDISCOVER request if DHCP server is on a separate IP subnet.

In step 1250, DHCP server 1125 queries management server 1120 and/or LDAP server 1130 to determine whether there is a location corresponding to information (e.g., ID information) in the DHCPDISCOVER request. If not, method 1200 ends.

In one such example, DHCP server 1125 queries management server 1120 for the location of the device upon receiving the DHCPDISCOVER request. DHCP server 1125 could use the MAC address, EPC value or another identifier coded into the DHCPDISCOVER request in order to reference wireless device 1105 to management server 1120. Management server 1120 could return the location of the RFID device to the DHCP server via the network. Depending on the implementation, management server 1120 could return a geographical coordinate or a predetermined location name such as "dock door 101."

DHCP server 1125 could query LDAP server 1130 for such information in a similar fashion. If management server 1120 is updating LDAP server 1130, DHCP server 1125 could obtain these and other data from LDAP server 1130.

If a device location is determined, DHCP server 1125 determines whether there are configuration data, personality data, etc. appropriate for the location and for the device type indicated in the DHCPDISCOVER request as described elsewhere herein. If there are not, method 1200 ends. If such data are found, DHCP server 1125 obtains these data (step 1255) and provides them to wireless device 1105. (Step 1260.) In this example, it is determined in step 1250 that location data for the device, such as a logical name, are also available. Accordingly, these data are also obtained in step 1255 and provided to wireless device 1105 in step 1260. Wireless device 1105 is provisioned accordingly in step 1265.

After an RFID reader is provisioned and configured, the RFID reader is ready for normal operation. The RFID reader will read RFID tags (step 1270) and transmit raw reads from the RFID tags to middleware servers, such as middleware servers 952 and 954 of FIG. 9A or middleware server 1170 of FIG. 11. In this example, the RFID reader will also encode and transmit location data (such as a logical name) obtained during the provisioning process, along with the raw reads. (Step 1275.) The logical name would have meaning to IT personnel monitoring the system, troubleshooting, etc.

Figure 13:
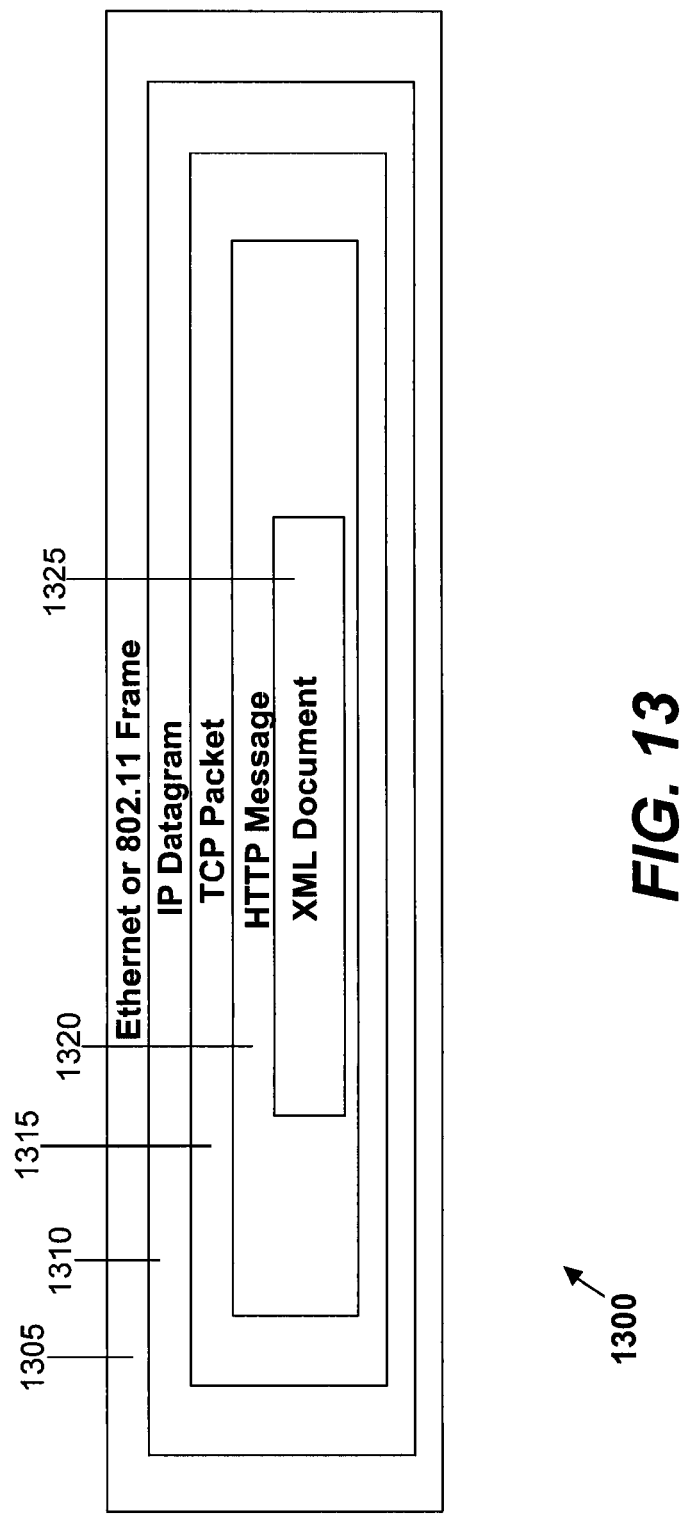
FIG. 13 illustrates one exemplary format of an RFID read that includes a logical device name and device location data.

FIG. 13 illustrates one exemplary format of an RFID read that includes a logical device name and/or device location data. In this example, the RFID reader is communicating with a middleware server over an Ethernet and has encoded RFID tag read 1300 in an XML document. Accordingly, the outermost layer of encapsulation is Ethernet layer 1305. Within Ethernet layer 1305 are IP datagram 1310 and TCP layer 1315. Accordingly, XML document 1325 is embedded in HTTP message 1320, which is encapsulated in a TCP/IP packet within an Ethernet frame.

In this example, XML document 1325 includes both a logical name ("dockDoor100") and latitude/longitude/altitude data, as follows:

```
<?xml version="1.0" encoding="UTF-8">
...
<rfidReader>
<readerName name="dockDoor100">
<readerLocation>
<locationCoordinates>
<lattitude>053C1F751</lattitude>
<longitude>F50BA5B97</longitude>
<altitude>00006700</altitude>
</locationCoordinates>
</readerLocation>
<readPoint id="1">
<epc >00000000000000000000000001</epc>
</readPoint>
</readerName>
</rfidReader>
```

Within the XML document, there is a single EPC tag read value ("<epc>00000000000000000000000000</epc>").

Figure 14:
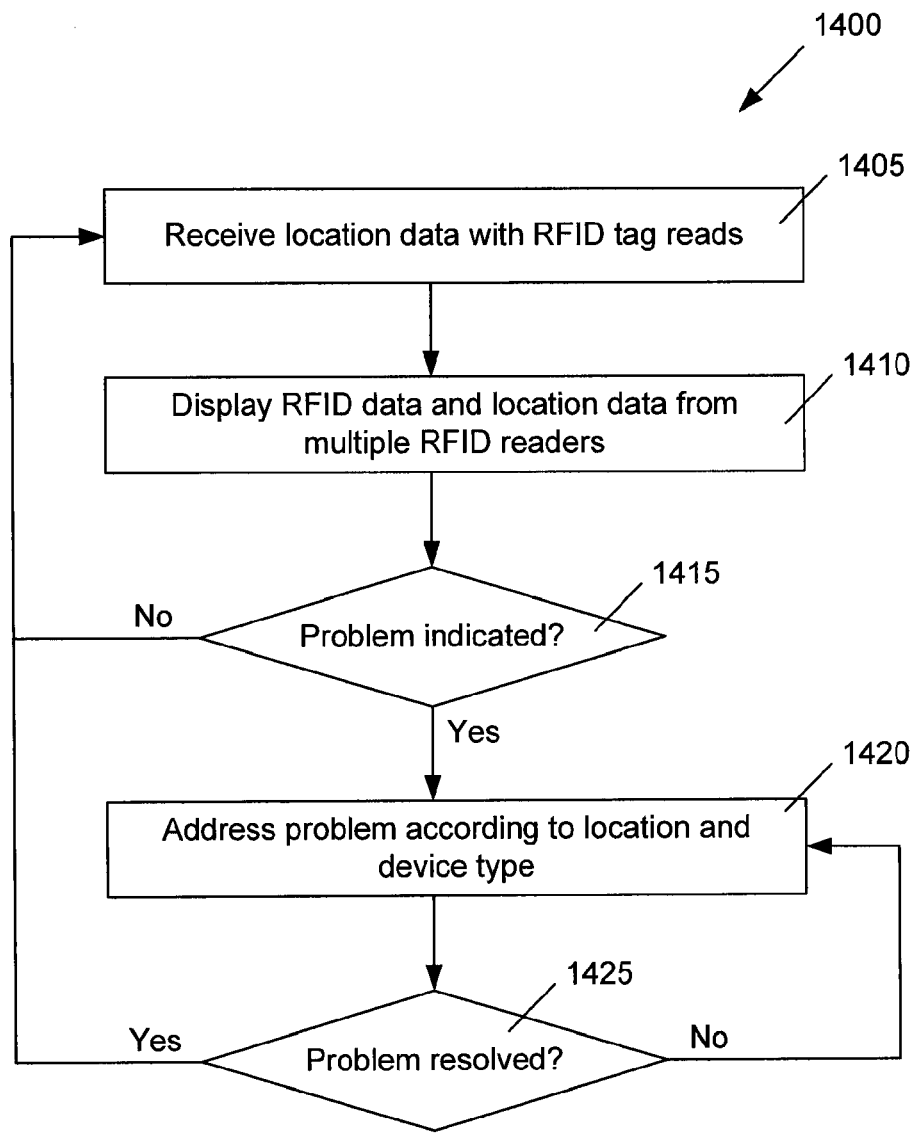
FIG. 14 is a flow chart that outlines another aspect of the present invention.

FIG. 14 is a flow chart that outlines a simplified method 1400 for using the location data and RFID tag reads provided by some aspects of the invention. Some steps of method 1400 may be performed, for example, by (and/or via) a management station such as management station 957 of FIG. 9A or management station 1150 of FIG. 11.

In step 1405, location data and RFID tag reads are received. In some systems of the prior art, a raw read might identify the originating RFID reader by using an identification number, such as a MAC address of the reader. The raw reads from a number of RFID readers are displayed, e.g., on a display monitor of a management station.

Instead of identifying a raw read as being from an RFID reader identified by a number, according to some aspects of the invention the read is associated with a location and/or a function via a logical name such as "dock door A," "Building 22, 3$^{rd}$ floor, conference room B," etc. Accordingly, it may be easier for IT personnel to determine when a problem is indicated (step 1415) and/or to more quickly address the problem (step 1420) and resolve it (step 1425) when such a problem is indicated.

In one example, an IT person is managing an RFID network for a factory and associated warehouses. The IT person is using a management station for this purpose, which has a screen that displays information about the various components of the network. For example, the screen may normally display many rows of entries that indicate at least part of a raw read and corresponding location data. In this example, the management station includes software that allows the IT person to display RFID reads according to various criteria, at least some of which correspond to location data. For example, the IT person is able to display all reads within a certain time frame that came from a particular location, e.g., from a particular dock door of a particular building. Accordingly, the IT person will be able to detect problems more easily. (Step 1415.)

The management station may also include software that provides for automatic notification when a predetermined event happens (or fails to happen). For example, a box may pop up on the display screen that indicates a problem, e.g., "I have not heard from [logical name of device] in 2 hours" or "[logical name of device] just sent a message indicating antenna failure." (Step 1415.)

The IT person may address such a problem (step 1420) more readily, because the problem indicated will be associated with a particular location name/logical name. For example, the problem may be addressed by interrogating an RFID device and/or the associated middleware server, by rebooting an RFID device, by notifying a person who works in or near the location indicated to replace a defective RFID device, etc. After the problem is resolved (step 1425), the management station will continue to receive and monitor RFID reads.

Figure 15:
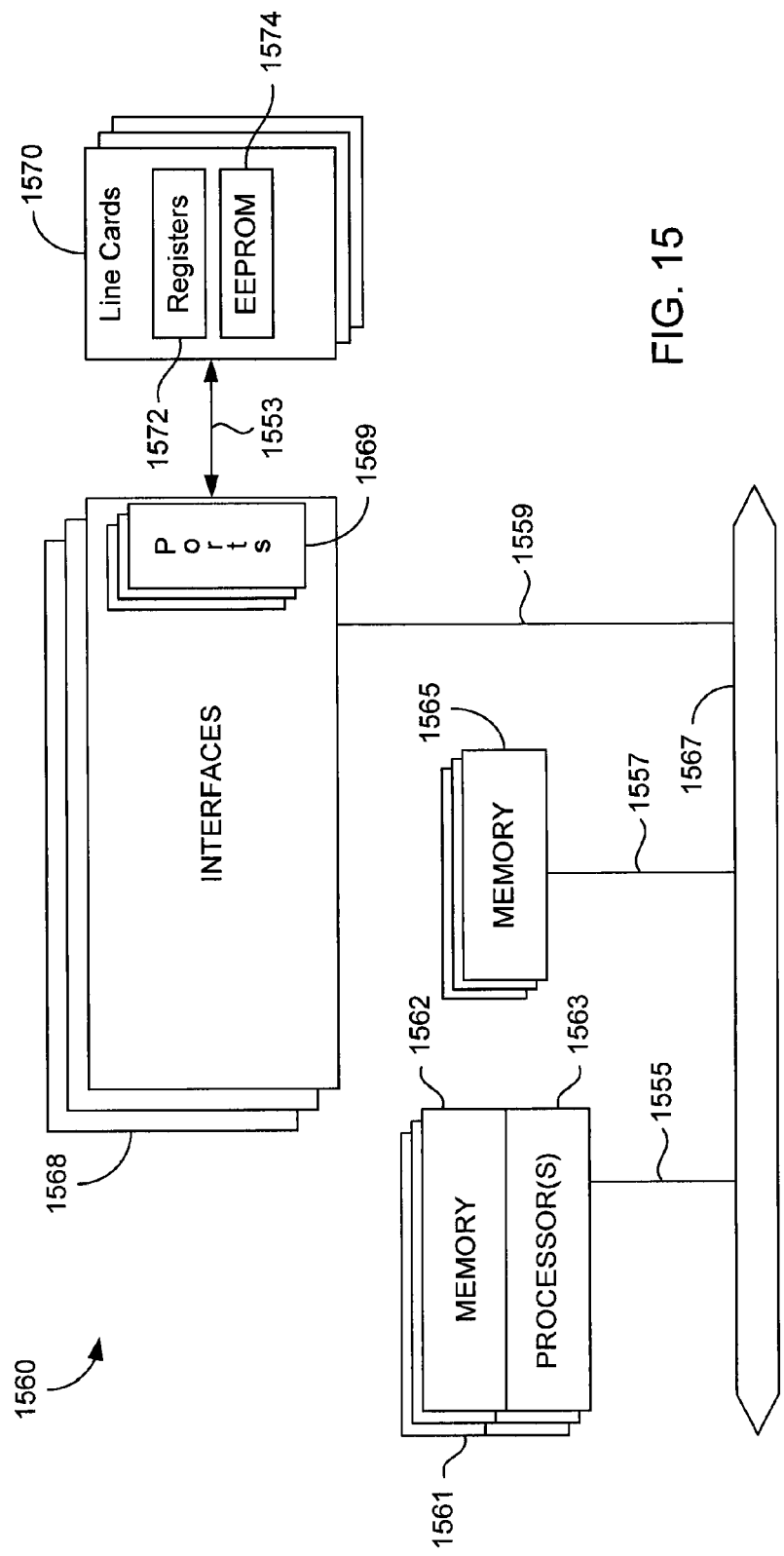
FIG. 15 illustrates an example of a network device that may be configured to implement some methods of the present invention.

FIG. 15 illustrates an example of a network device that may be configured to implement some methods of the present invention. Network device 1560 includes a master central processing unit (CPU) 1562, interfaces 1568, and a bus 1567 (e.g., a PCI bus). Generally, interfaces 1568 include ports 1569 appropriate for communication with the appropriate media. In some embodiments, one or more of interfaces 1568 includes at least one independent processor 1574 and, in some instances, volatile RAM. Independent processors 1574 may be, for example ASICs or any other appropriate processors. According to some such embodiments, these independent processors 1574 perform at least some of the functions of the logic described herein. In some embodiments, one or more of interfaces 1568 control such communications-intensive tasks as media control and management. By providing separate processors for the communications-intensive tasks, interfaces 1568 allow the master microprocessor 1562 efficiently to perform other functions such as routing computations, network diagnostics, security functions, etc.

The interfaces 1568 are typically provided as interface cards (sometimes referred to as "line cards"). Generally, interfaces 1568 control the sending and receiving of data packets over the network and sometimes support other peripherals used with the network device 1560. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1562 may be responsible for implementing specific functions associated with the functions of a desired network device. According to some embodiments, CPU 1562 accomplishes all these functions under the control of software including an operating system (e.g. Linux, VxWorks, etc.), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 15 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/ line cards may be bus based (as shown in FIG. 15) or switch fabric based (such as a cross-bar).

OTHER EMBODIMENTS

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

We claim:

1. A method of provisioning a device, the method comprising:
    initializing a radio frequency identification ("RFID") device;
    reading RFID tag data from an RFID tag;
    inserting the RFID tag data in an option field of a DHCPDISCOVER request;
    sending the DHCPDISCOVER request to a Dynamic Host Configuration Protocol ("DHCP")server;
    ascertaining, based at least in part on the RFID tag data, a location and a logical name of the RFID device;
    determining, based in part on the location of the RFID device, an appropriate configuration for the RFID device; and
    provisioning the RFID device according to the appropriate configuration, wherein the provisioning step comprises provisioning the RFID device with a logical name.

2. The method of claim 1, wherein the RFID device is a wireless RFID device.

3. The method of claim 2, wherein at least one step is performed by the DHCP server.

4. The method of claim 1, wherein the ascertaining step comprises accessing a data structure that includes RFID tag data and corresponding location data and logical names.

5. The method of claim 1, wherein at least part of the ascertaining step is performed by the DHCP server.

6. A method of provisioning a wireless device, the method comprising:
    receiving IEEE 802.11b location data from a plurality of wireless access points;
    ascertaining, based at least in part on the IEEE 802.11b location data, a location and a logical name of a radio frequency identification wireless device;
    determining an appropriate configuration for the wireless device according to the location; and
    provisioning the wireless device, wherein the configuring step comprises supplying the wireless device with the appropriate configuration and with a logical name.

7. The method of claim 6, wherein the IEEE 802.11b location data comprise one of time data and signal strength data.

8. A method for deploying a uniquely-provisioned radio frequency identification ("RFID") device in a network, the method comprising:
    reading first location information from a first RFID tag;
    forming a DHCPDISCOVER request that includes an electronic product code ("EPC") of an RFID reader and the first location information;
    sending the DHCPDISCOVER request to a Dynamic Host Configuration Protocol ("DHCP") server;
    receiving provisioning information from the DHCP server that enables a desired functionality according to an identity and a location of the RFID reader, the provisioning information including second location information; and
    provisioning the RFID reader according to the provisioning information, thereby enabling the RFID reader to read nearby RFID tags and to transmit RFID tag information and second location information to an RFID network.

9. The method of claim 8, wherein the first location information comprises one of coordinate information and civil address information.

10. The method of claim 8, wherein the second location information comprises a logical name.

11. A network, comprising:
    a plurality of radio frequency identification ("RFID") devices;
    a plurality of switches connecting the RFID devices to the network; and
    a Dynamic Host Configuration Protocol ("DHCP") server, wherein at least some of the RFID devices comprise:
        one or more RF radios configured for reading first location information from a first RFID tag;
        a network interface;
        a central processing unit configured to do the following:
            form a DHCPDISCOVER request that includes an electronic product code ("EPC") of an RFID reader and the first location information;
            send the DHCPDISCOVER request to the DHCP server via the network interface;
            receive, via the network interface, provisioning information from the DHCP server that enables a desired functionality according to an identity and a location of the RFID reader, the provisioning information including second location information; and provision the RFID reader according to the provisioning information, thereby enabling the RFID reader to read nearby RFID tags and to transmit RFID tag information and second location information to an RFID network; and
    wherein the DHCP server comprises:
        an interface for receiving the DHCPDISCOVER request; and
        a processor configured to do the following:
            automatically identify an RFID device according to a media access control ("MAC") address and an EPC included in the DHCPDISCOVER request;
            locate the RFID device;
            determine the second location information according to the first location information included in the DHCPDISCOVER request; and
            provide, via the interface, the RFID device with a desired functionality and the second location information.

12. A method of provisioning a device, the method comprising:
    initializing an RFID device;
    obtaining first location data;
    inserting the first location data in an option field of a DHCPDISCOVER request; and
    sending the DHCPDISCOVER request to a Dynamic Host Configuration Protocol ("DHCP")server;
    determining provisioning information, including a logical name, based at least in part on the first location data;
    providing the provisioning information to the device;
    configuring the device according to the provisioning information;
    reading RFID tag data from RFID tags; and
    transmitting the RFID tag data to a middleware server along with the logical name.

13. The method of claim 12, wherein the RFID device includes global positioning system ("GPS") capability and wherein the first location data comprise GPS data.

14. A network for provisioning a device, the network comprising:
   means for initializing a radio frequency identification ("RFID") device;
   means for reading RFID tag data from an RFID tag;
   means for inserting the RFID tag data in an option field of a DHCPDISCOVER request;
   means for sending the DHCPDISCOVER request to a Dynamic Host Configuration Protocol ("DHCP") server;
   means for ascertaining, based at least in part on the RFID tag data, a location and a logical name of the RFID device;
   means for determining, based in part on the location of the RFID device, an appropriate configuration for the RFID device; and
   means for providing the RFID device with provisioning information comprising a logical name and an appropriate configuration.

15. A radio frequency identification ("RFID") device, comprising:
   one or more RF radios configured for reading first location information from a first RFID tag;
   a network interface;
   a central processing unit configured to do the following:
      form a DHCPDISCOVER request that includes an electronic product code ("EPC") of an RFID reader and the first location information;
      send the DHCPDISCOVER request to a Dynamic Host Configuration Protocol ("DHCP") server;
      receive, via the network interface, provisioning information from the DHCP server that enables a desired functionality according to an identity and a location of the RFID reader, the provisioning information including second location information; and
      provision the RFID reader according to the provisioning information, thereby enabling the RFID reader to read nearby RFID tags and to transmit RFID tag information and second location information to an RFID network.

16. A network for provisioning a device, the network comprising:
   a radio frequency identification ("RFID") device, comprising:
      a memory having a computer program stored thereon, the computer program containing instructions for initializing the RFID device;
      a network interface; and
      a central processing unit configured to do the following:
         obtain first location data;
         insert the first location data in an option field of a DHCPDISCOVER request; and
         send, via the network interface, the DHCPDISCOVER request to a Dynamic Host Configuration Protocol ("DHCP") server; and
   a DHCP server, comprising:
      an interface configured to receive the DHCPDISCOVER request; and
      a processor configured to do the following:
         determine provisioning information, including a logical name, based at least in part on the first location data in the DHCPDISCOVER request; and
         provide the provisioning information to the RFID device via the interface;
   wherein the RFID device is further configured to do the following:
      configure the device according to the provisioning information;
      read RFID tag data from RFID tags; and
      transmit the RFID tag data to a middleware server along with the logical name.

* * * * *

UNITED STATES PATENT AND TRADEMARK OFFICE
CERTIFICATE OF CORRECTION

PATENT NO.       : 7,648,070 B2                                          Page 1 of 1
APPLICATION NO. : 11/129709
DATED            : January 19, 2010
INVENTOR(S)      : Droms et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 667 days.

Signed and Sealed this

Twenty-eighth Day of December, 2010

David J. Kappos
*Director of the United States Patent and Trademark Office*